Figure 1:
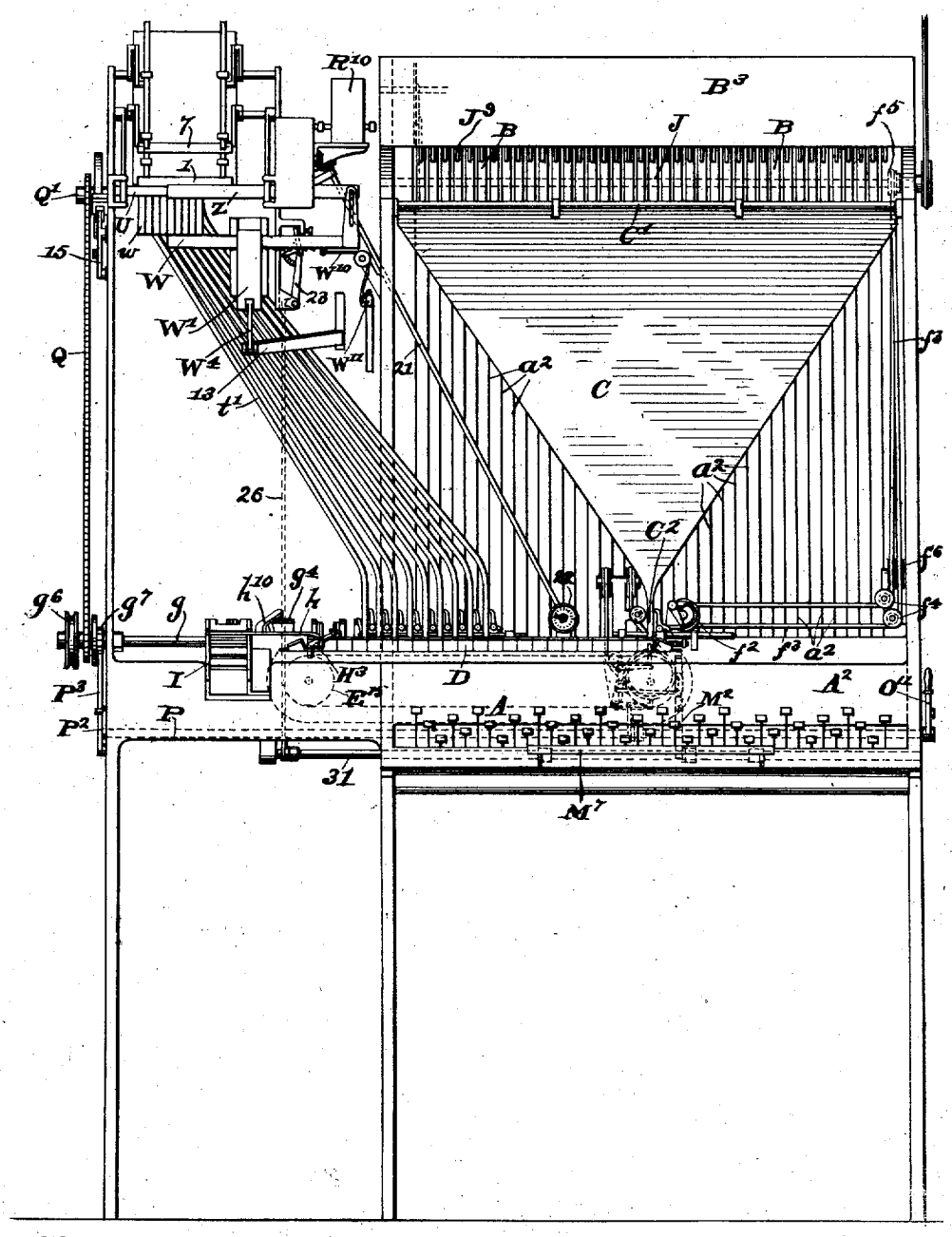

No. 12,426. REISSUED DEC. 26, 1905.

B. A. BROOKS.

MECHANISM FOR PREPARING PRINTING SURFACES.

APPLICATION FILED APR. 15, 1904.

19 SHEETS—SHEET 1.

Witnesses:
W. A. Pauling
G. J. Rathjen

Inventor:
Byron A. Brooks
by Chas. W. Pike Att'ys.

No. 12,426. REISSUED DEC. 26, 1905.
B. A. BROOKS.
MECHANISM FOR PREPARING PRINTING SURFACES.
APPLICATION FILED APR. 15, 1904.
19 SHEETS—SHEET 2
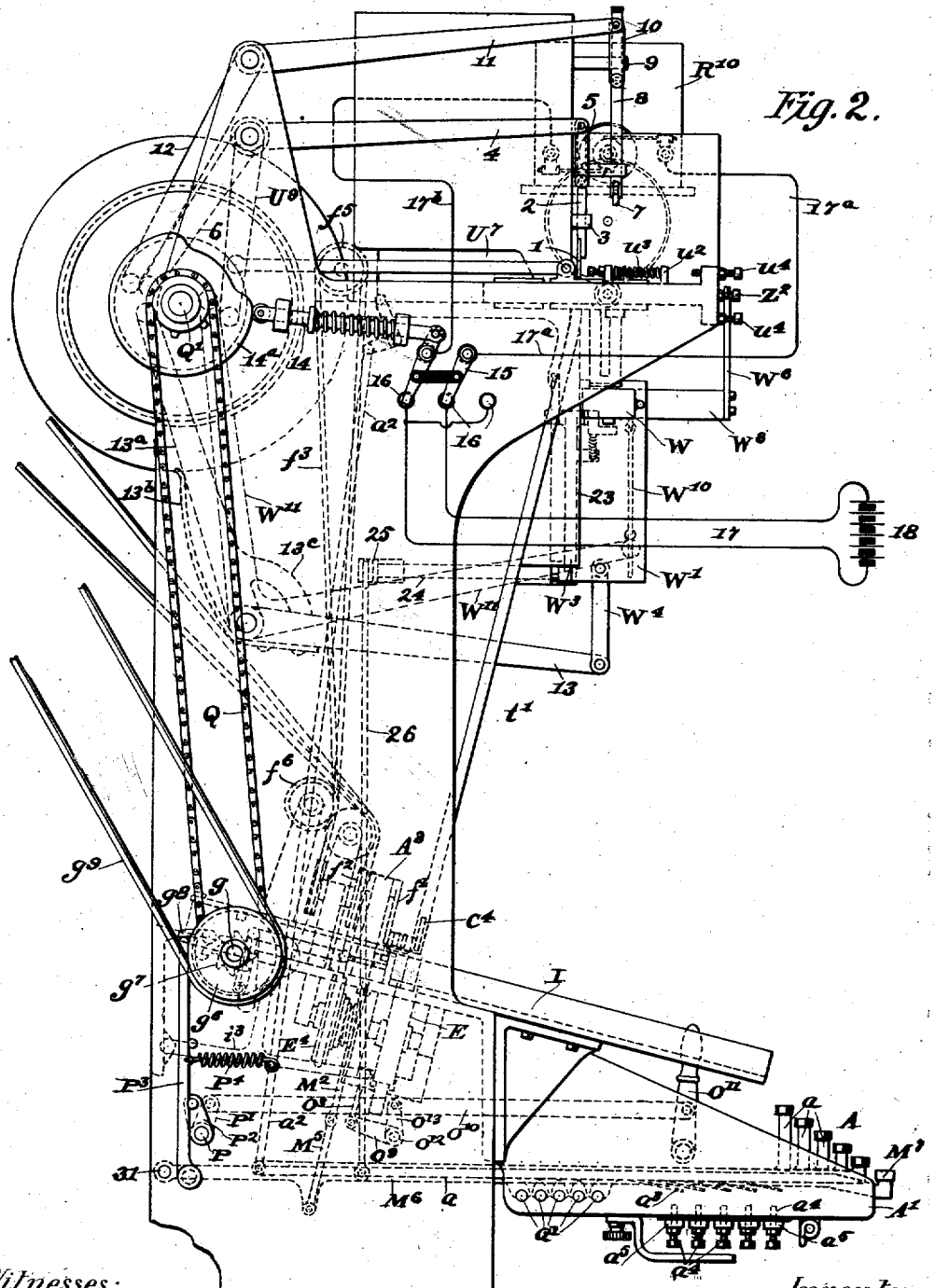
Witnesses:
W. A. Paulding
C. J. Rathjen.
Inventor:
Byron A. Brooks
by Chiffard Price Att'ys.

No. 12,426. REISSUED DEC. 26, 1905.

B. A. BROOKS.

MECHANISM FOR PREPARING PRINTING SURFACES.

APPLICATION FILED APR. 15, 1904.

19 SHEETS—SHEET 3.

Witnesses:
W. A. Pauling
C. J. Rathjen

Inventor:
Byron A. Brooks
by Chiffert & Price Att'ys.

No. 12,426. REISSUED DEC. 26, 1905.

B. A. BROOKS.

MECHANISM FOR PREPARING PRINTING SURFACES.

APPLICATION FILED APR. 15, 1904.

19 SHEETS—SHEET 4.

Witnesses:
W. A. Pauling
E. J. Rathjen

Inventor:
Byron A. Brooks
by Gifford & Pheel Att'ys.

No. 12,426. REISSUED DEC. 26, 1905.

B. A. BROOKS.

MECHANISM FOR PREPARING PRINTING SURFACES.

APPLICATION FILED APR. 15, 1904.

19 SHEETS—SHEET 5.

Witnesses:
W. A. Pauling
C. J. Rathjen

Inventor:
Byron A. Brooks
by Clifford & Rice Att'ys.

No. 12,426. REISSUED DEC. 26, 1905.

B. A. BROOKS.

MECHANISM FOR PREPARING PRINTING SURFACES.

APPLICATION FILED APR. 15, 1904.

19 SHEETS—SHEET 6.

Witnesses:
W. A. Pauling
G. J. Rathgen

Inventor:
Byron A. Brooks
by Chiffard & Page Att'ys.

No. 12,426. REISSUED DEC. 26, 1905.
B. A. BROOKS.
MECHANISM FOR PREPARING PRINTING SURFACES.
APPLICATION FILED APR. 15, 1904.
19 SHEETS—SHEET 7.
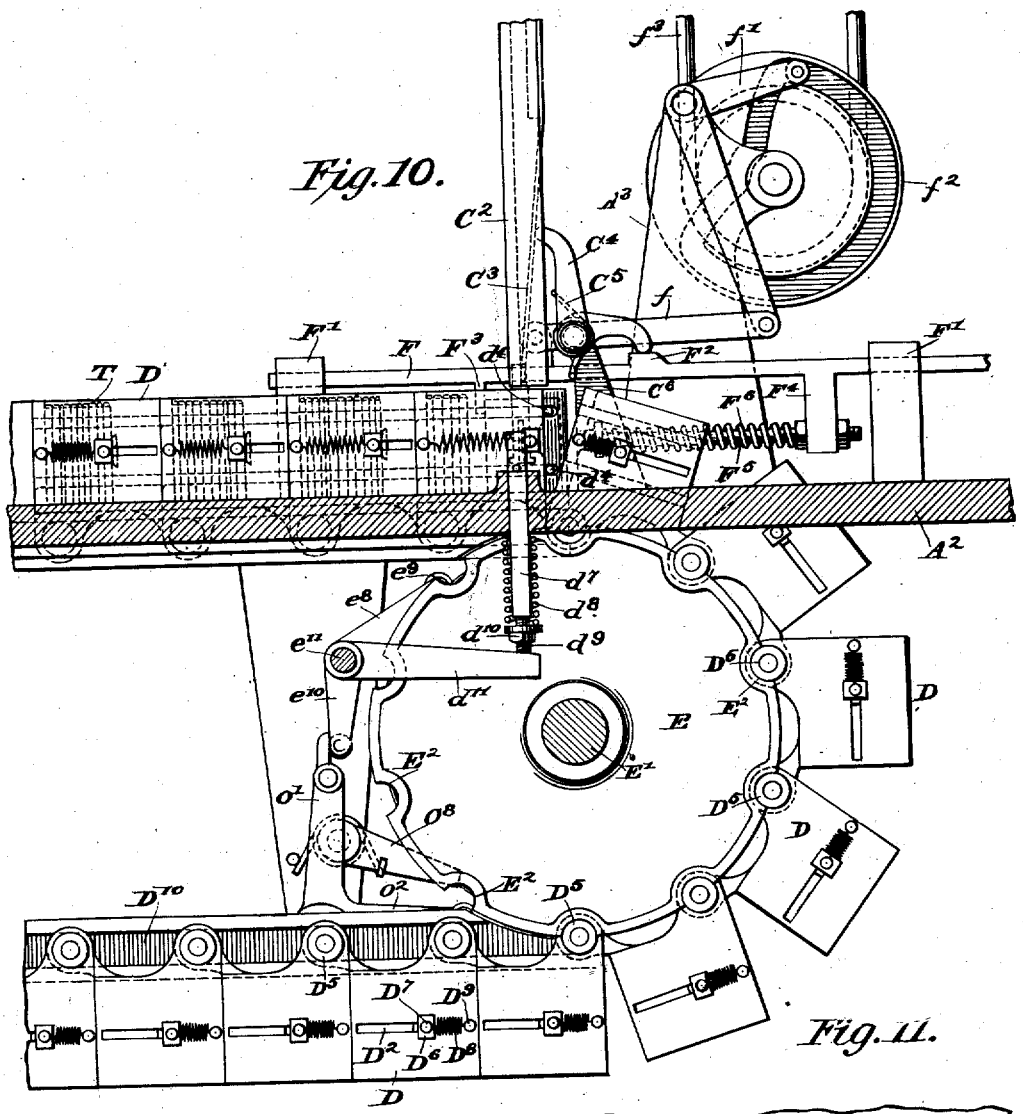
Witnesses:
W. A. Pauling
G. J. Rathjen
Inventor:
Byron A. Brooks
by Gifford & Pree Att'ys.

No. 12,426. REISSUED DEC. 26, 1905.

B. A. BROOKS.

MECHANISM FOR PREPARING PRINTING SURFACES.

APPLICATION FILED APR. 15, 1904. 19 SHEETS—SHEET 8

Witnesses:
W. A. Pauling
C. J. Rathjen

Inventor:
Byron A. Brooks
by Chiffard & Pulle Att'ys.

No. 12,426. REISSUED DEC. 26, 1905.

B. A. BROOKS.

MECHANISM FOR PREPARING PRINTING SURFACES.

APPLICATION FILED APR. 15, 1904.

19 SHEETS—SHEET 9.

Witnesses:
W. A. Pauling
C. J. Rathjen

Inventor:
Byron A. Brooks
by Clifford Reel Att'ys.

No. 12,426. REISSUED DEC. 26, 1905.
B. A. BROOKS.
MECHANISM FOR PREPARING PRINTING SURFACES.
APPLICATION FILED APR. 15, 1904.
19 SHEETS—SHEET 10.
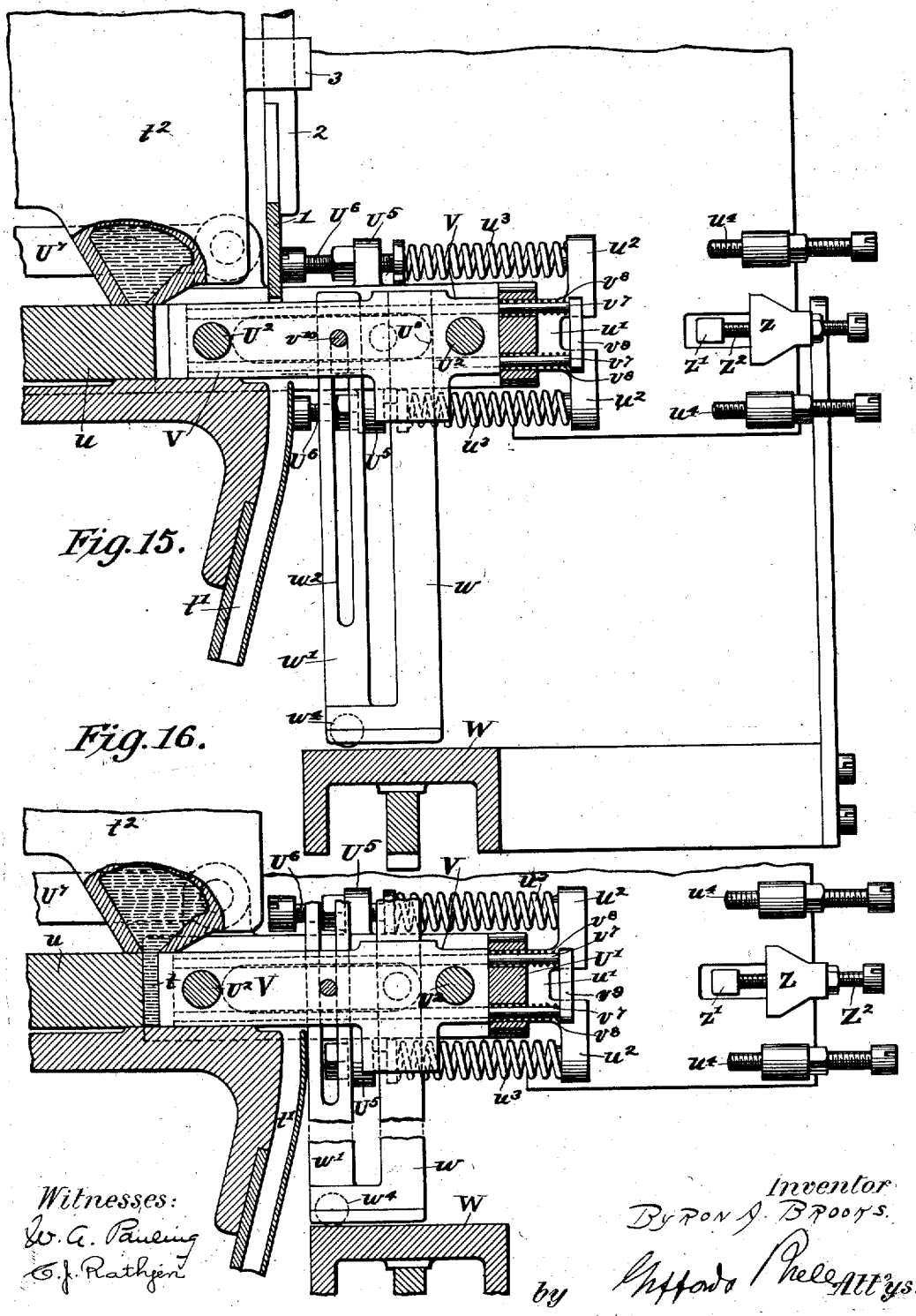
Witnesses:
W. A. Pauling
C. J. Rathjen
Inventor
Byron A. Brooks.
by Chas. Phelps Att'ys.

No. 12,426. REISSUED DEC. 26, 1905.
B. A. BROOKS.
MECHANISM FOR PREPARING PRINTING SURFACES.
APPLICATION FILED APR. 15, 1904. 19 SHEETS—SHEET 11
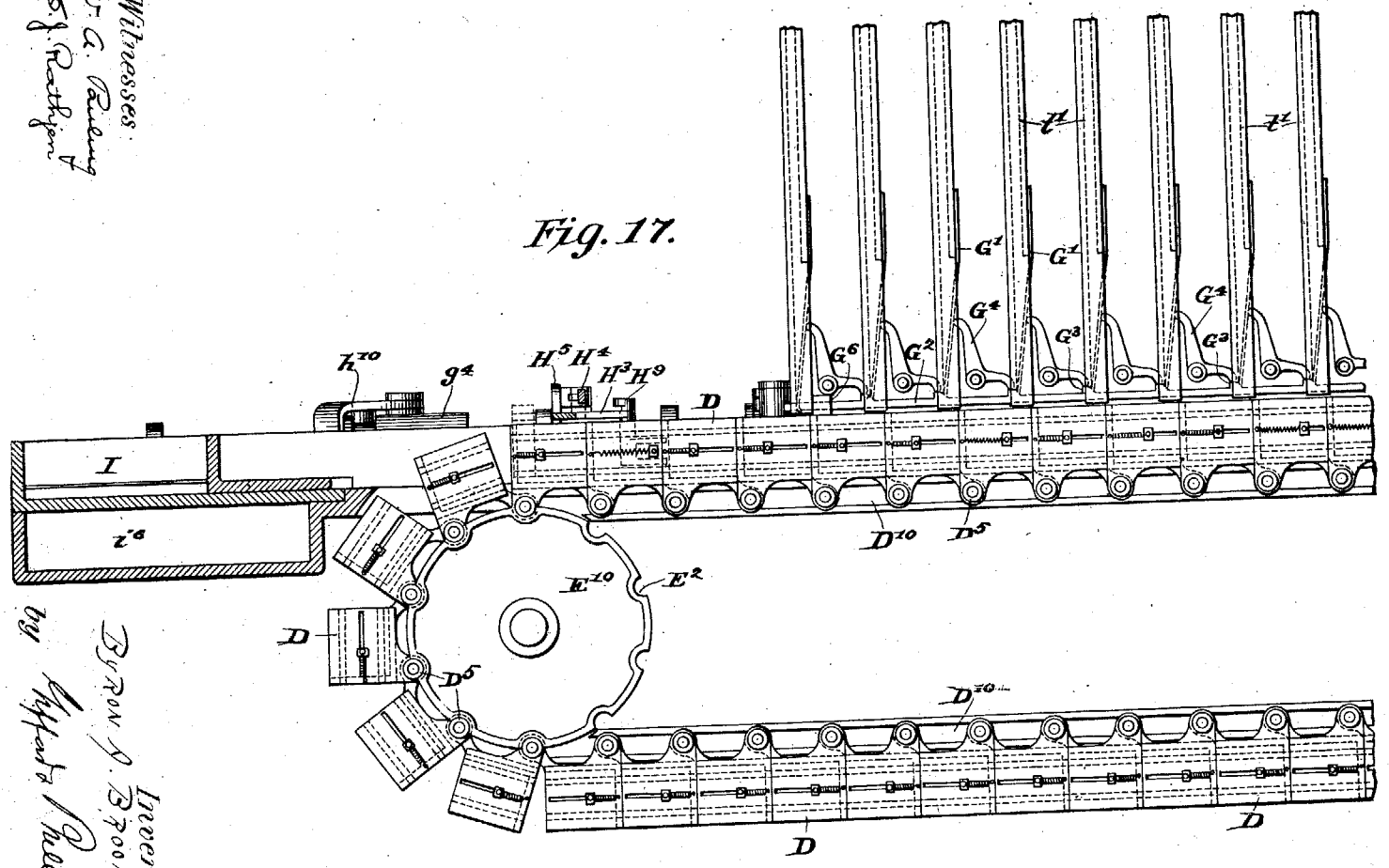
Witnesses:
W. A. Pauling
O. J. Rathjen
Inventor:
Byron A. Brooks
by Gifford & Pulle Attys.

No. 12,426. REISSUED DEC. 26. 1905.

B. A. BROOKS.

MECHANISM FOR PREPARING PRINTING SURFACES.

APPLICATION FILED APR. 15, 1904.

19 SHEETS—SHEET 12.

Witnesses:
W. A. Pauling
C. J. Rathjen

Inventor:
Byron A. Brooks
by Gifford & Lee Att'ys.

No. 12,426. REISSUED DEC. 26, 1905.

B. A. BROOKS.

MECHANISM FOR PREPARING PRINTING SURFACES.

APPLICATION FILED APR. 15, 1904.

19 SHEETS—SHEET 13.

Witnesses:
Ed. A. Pauling
E. J. Rathjen

Inventor
Byron A. Brooks
by Gifford & Chase Att'ys.

No. 12,426. REISSUED DEC. 26, 1905.

B. A. BROOKS.

MECHANISM FOR PREPARING PRINTING SURFACES.

APPLICATION FILED APR. 15, 1904.

19 SHEETS—SHEET 14.

Witnesses:
W. A. Pauling
C. J. Rathjen

Inventor:
Byron A. Brooks
by Clifford & Pell Att'ys.

No. 12,426. REISSUED DEC. 26, 1905.

B. A. BROOKS.

MECHANISM FOR PREPARING PRINTING SURFACES.

APPLICATION FILED APR. 15, 1904.

19 SHEETS—SHEET 15.

Witnesses:
W. A. Pauling
F. J. Rathjen

Inventor:
Byron A. Brooks
by Gifford & Hull Att'ys.

No. 12,426. REISSUED DEC. 26, 1905.

B. A. BROOKS.

MECHANISM FOR PREPARING PRINTING SURFACES.

APPLICATION FILED APR. 15, 1904.

19 SHEETS—SHEET 16.

Witnesses:
W. A. Pauling
E. J. Rathjen

Inventor:
Byron A. Brooks
by Gifford & Pelle Att'ys.

No. 12,426.
REISSUED DEC. 26, 1905.
B. A. BROOKS.
MECHANISM FOR PREPARING PRINTING SURFACES.
APPLICATION FILED APR. 15, 1904
19 SHEETS—SHEET 17.
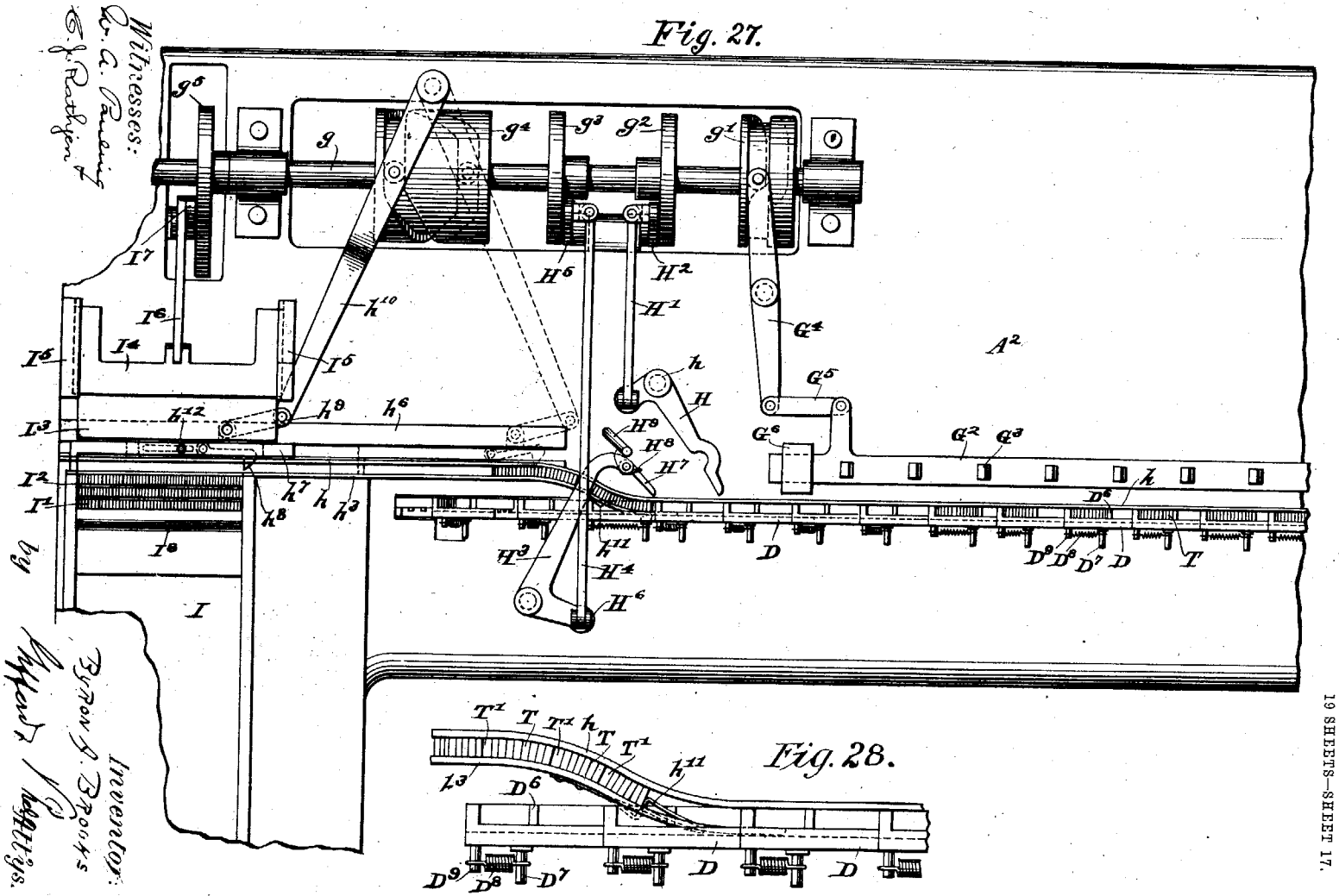

No. 12,426. REISSUED DEC. 26, 1905.

B. A. BROOKS.

MECHANISM FOR PREPARING PRINTING SURFACES.

APPLICATION FILED APR. 15, 1904.

19 SHEETS—SHEET 18.

Witnesses:
W. A. Pauling
C. J. Rathjen

Inventor:
Byron A. Brooks
by Chfford Shale Att'ys.

No. 12,426. REISSUED DEC. 26, 1905.
B. A. BROOKS.
MECHANISM FOR PREPARING PRINTING SURFACES.
APPLICATION FILED APR. 15, 1904.
19 SHEETS—SHEET 19.
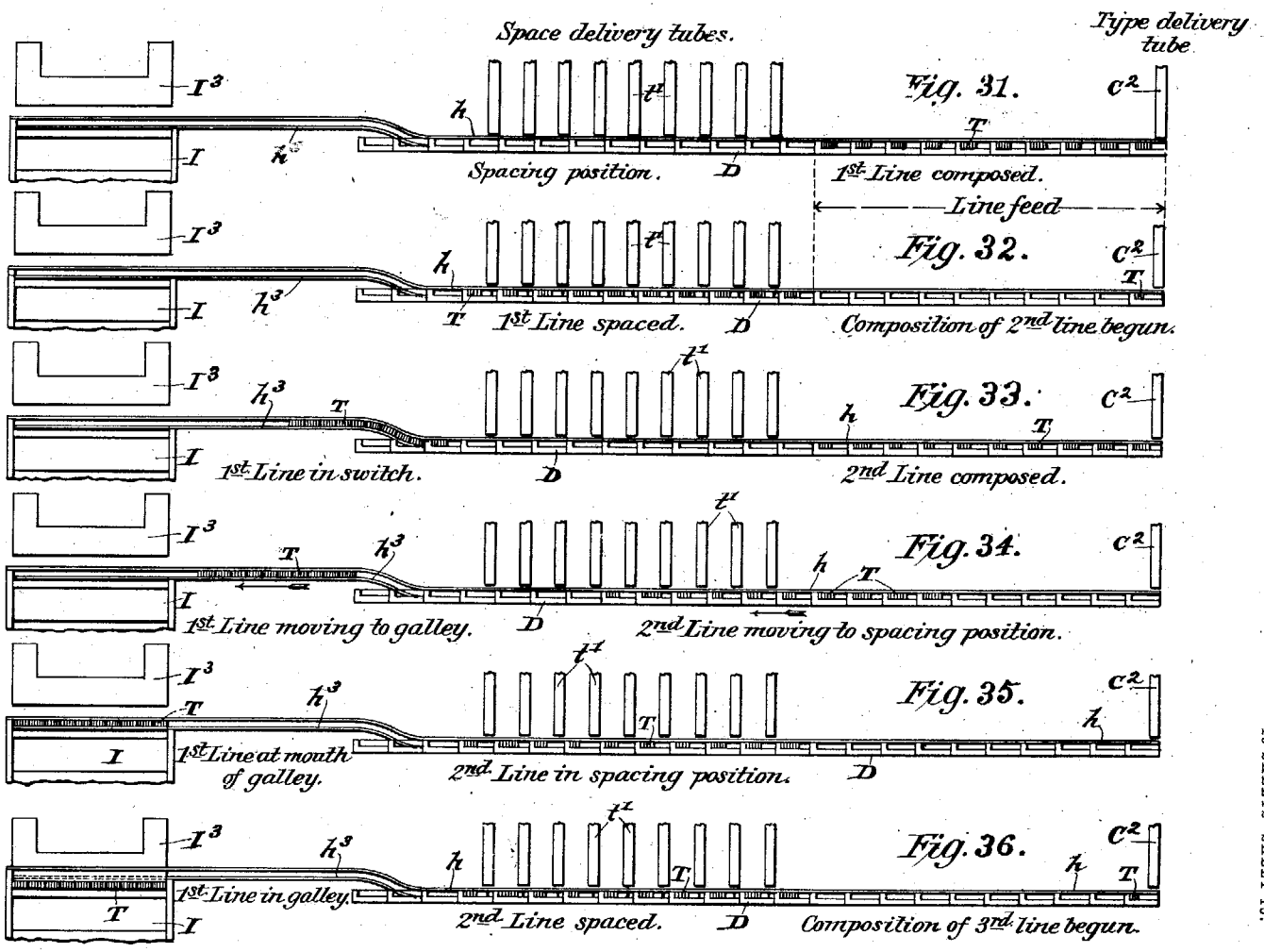
Witnesses:
W. A. Pauling
E. J. Rathjen
Inventor:
BYRON A. BROOKS
by Clifford & Pree - Att'ys.

UNITED STATES PATENT OFFICE.

BYRON A. BROOKS, OF NEW YORK, N. Y.

MECHANISM FOR PREPARING PRINTING-SURFACES.

No. 12,426. Specification of Reissued Letters Patent. Reissued Dec. 26, 1905.

Original No. 748,578, dated January 5, 1904. Application for reissue filed April 15, 1904. Serial No. 204,137.

*To all whom it may concern:*

Be it known that I, BYRON A. BROOKS, a citizen of the United States, and a resident of the city of New York, borough of Brooklyn, in the county of Kings and State of New York, have invented a new and Improved Mechanism for Preparing Printing-Surfaces, of which the following is a full, clear, and exact description.

My invention consists of certain novel parts and combinations of parts, the several features of which will be separately and specifically pointed out in the claims concluding this specification.

The following description, taken in connection with the accompanying drawings, will enable persons skilled in the art to which my invention relates to understand its nature and to practice it in the form in which I have preferred to embody it; but it will be understood that my invention is not limited to the precise devices or combinations of devices herein illustrated and described, as various modifications may be made without departing from the spirit of my invention and without exceeding the scope of the claims concluding this specification.

Reference is to be had to the accompanying drawings, forming a part of this specification, in which similar characters of reference indicate corresponding parts in all the figures.

Figure 4:
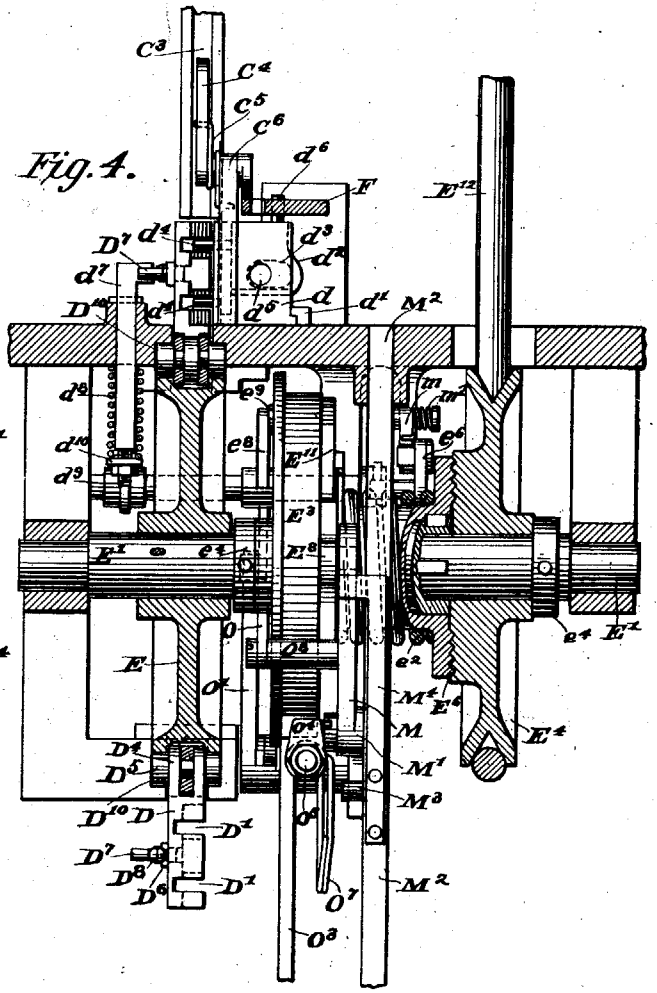
Figure 3:
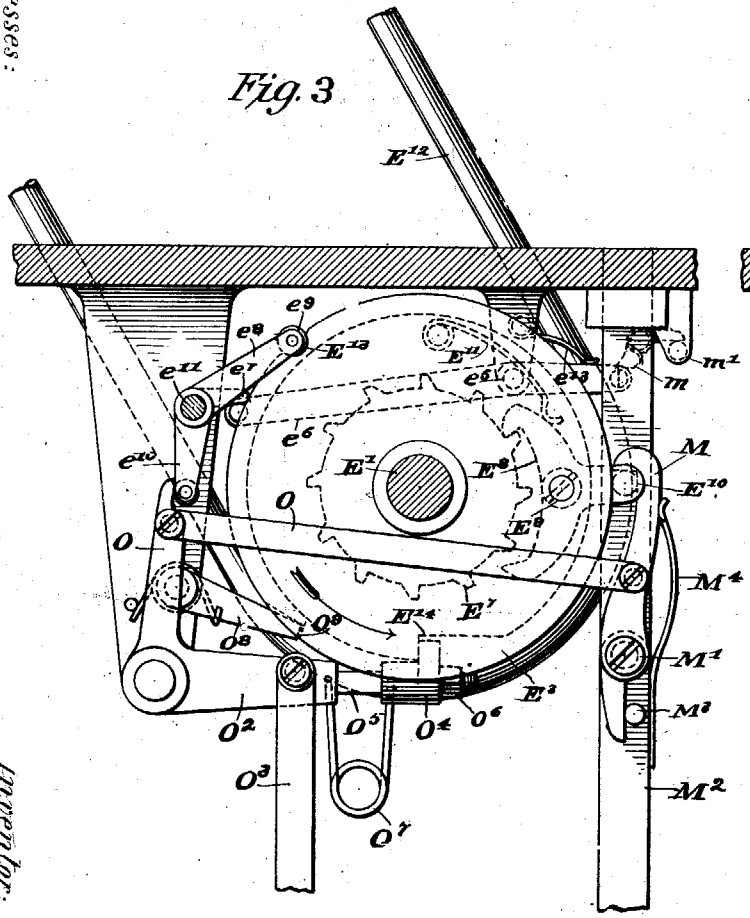
Figure 5:
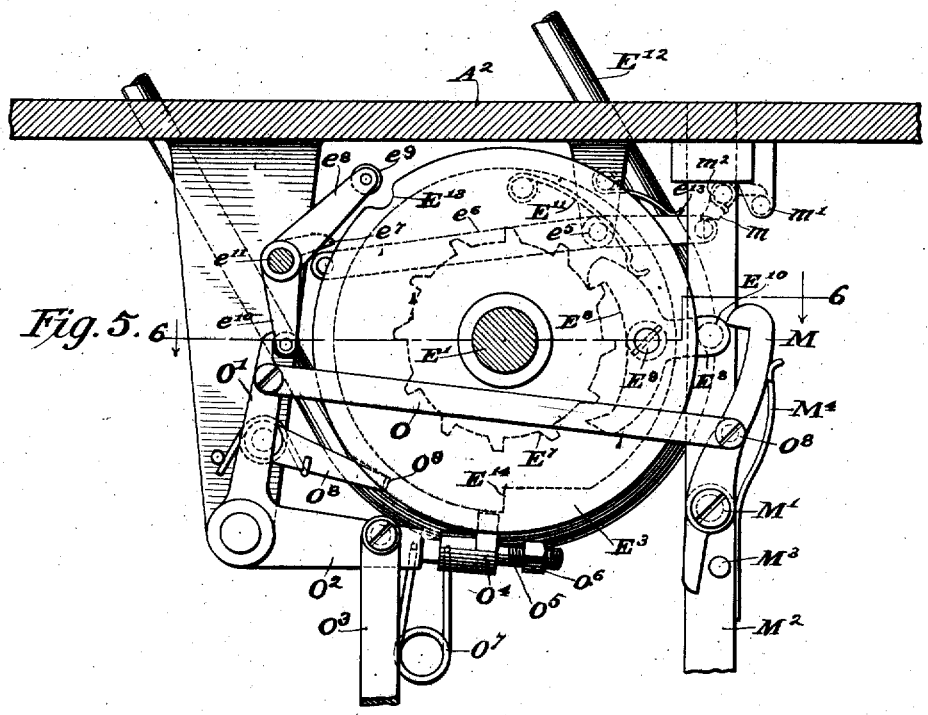
Figure 6:
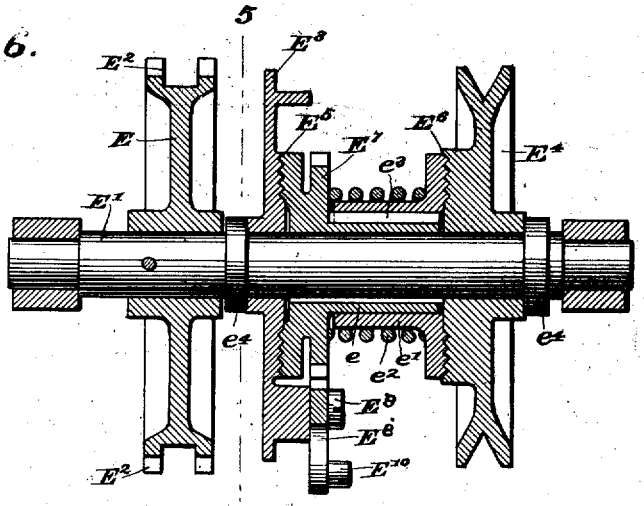
Figure 7:
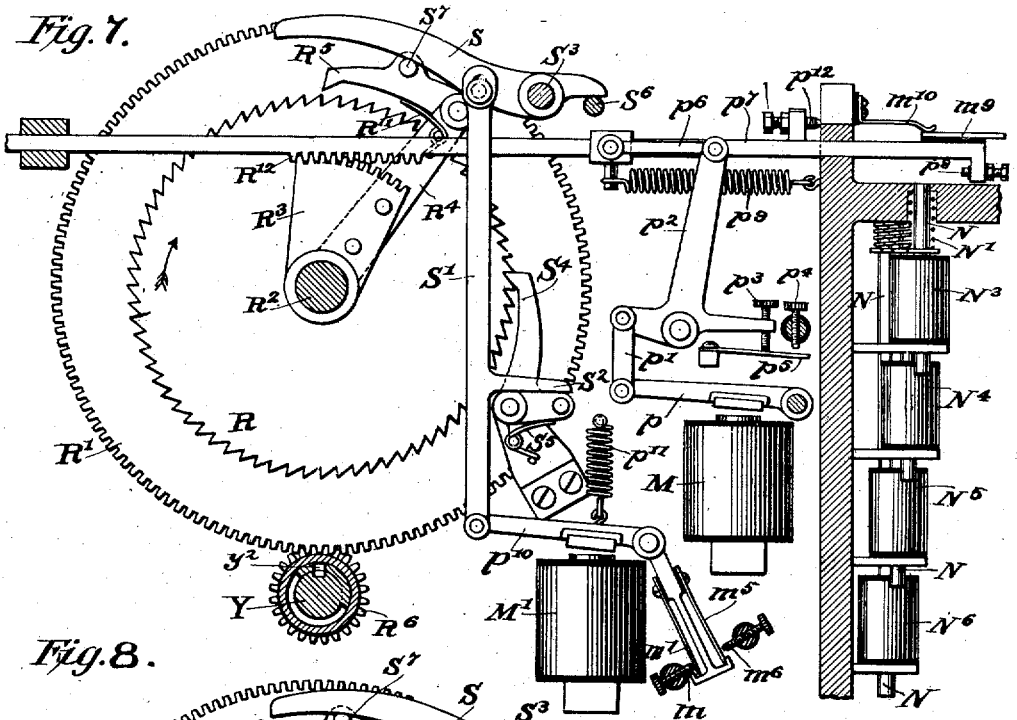
Figure 8:
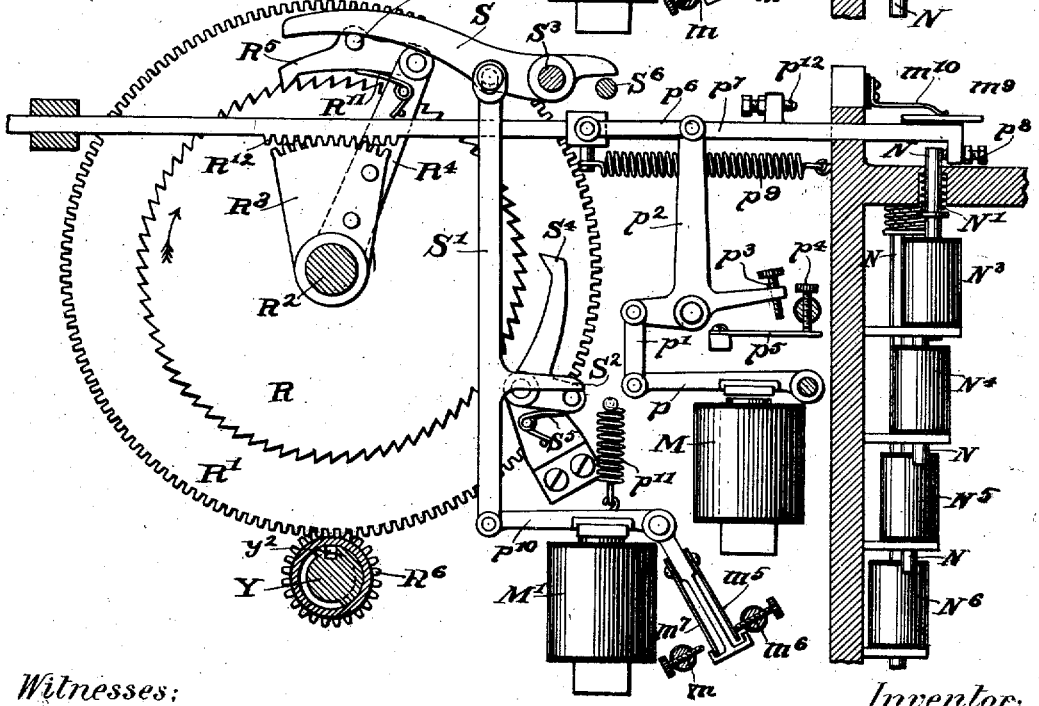
Figure 9:
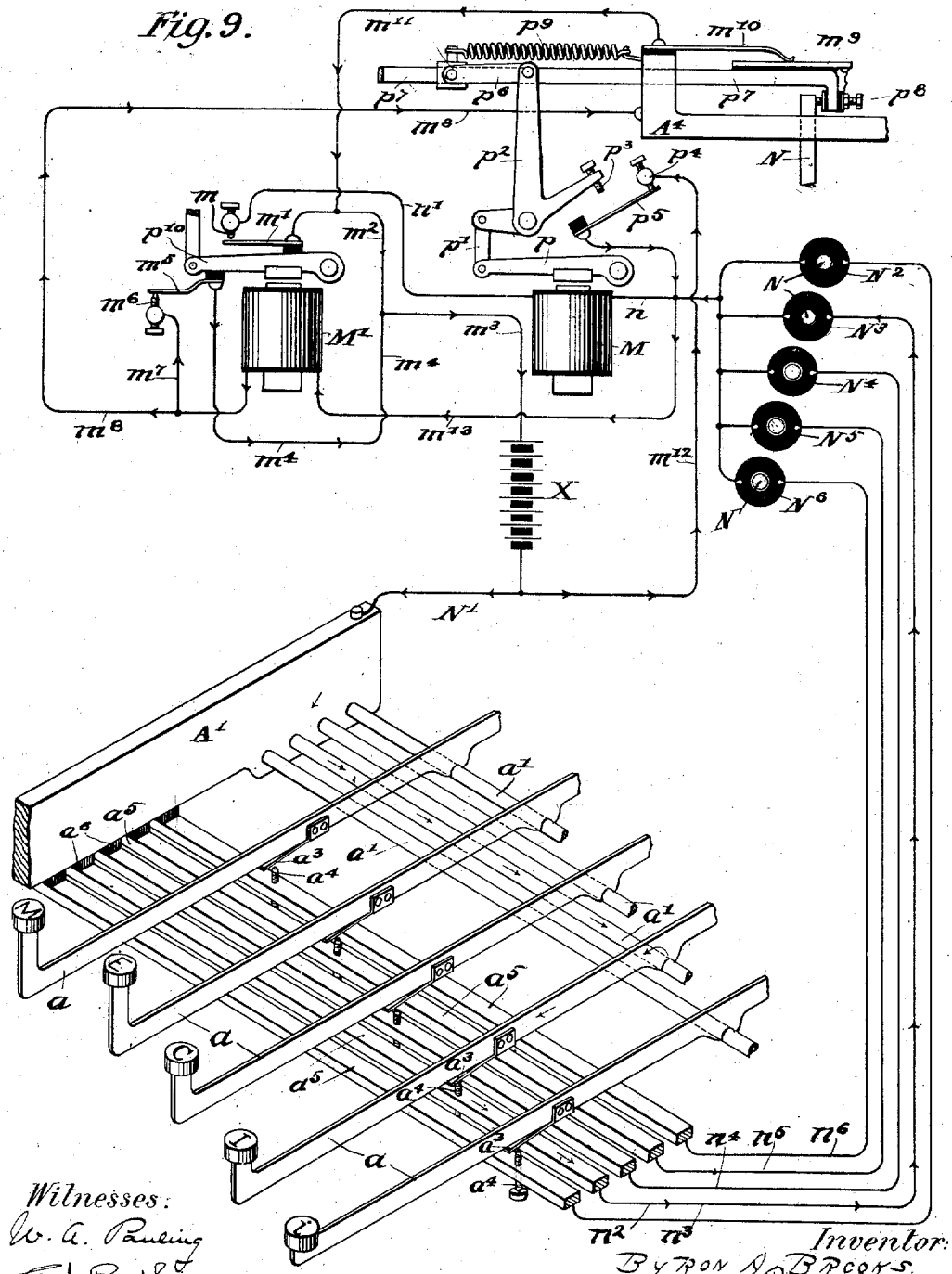
Figure 12:
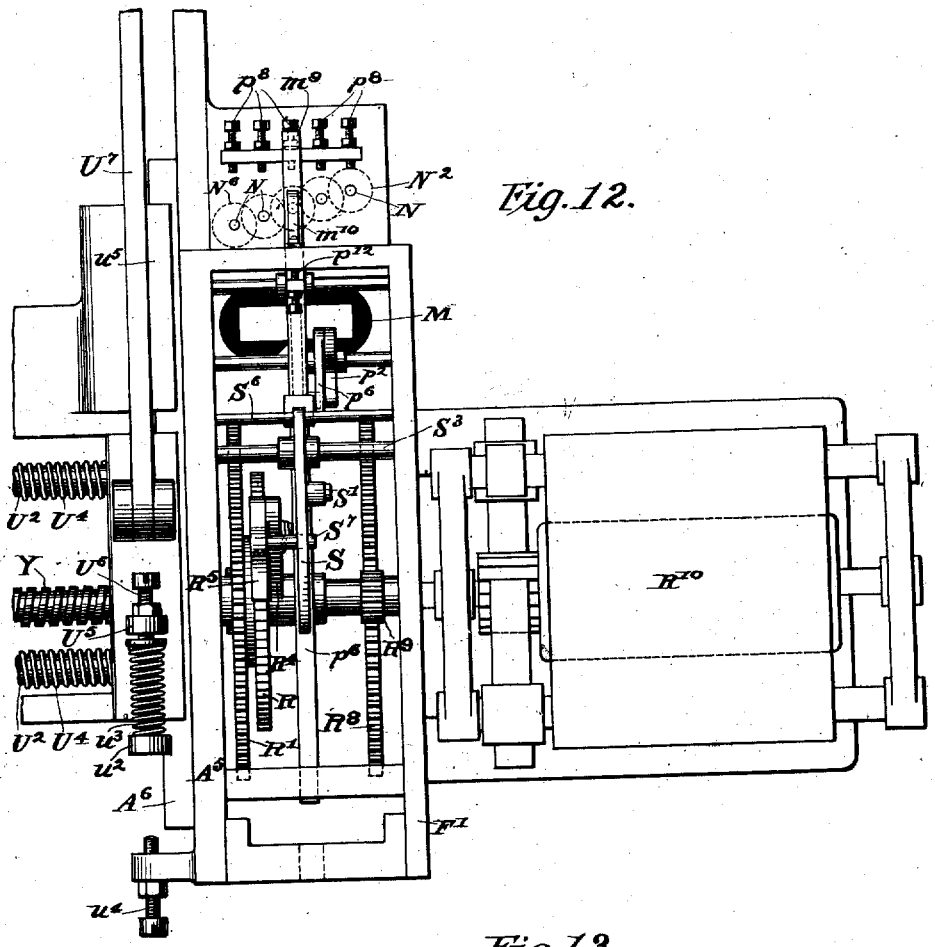
Figure 13:
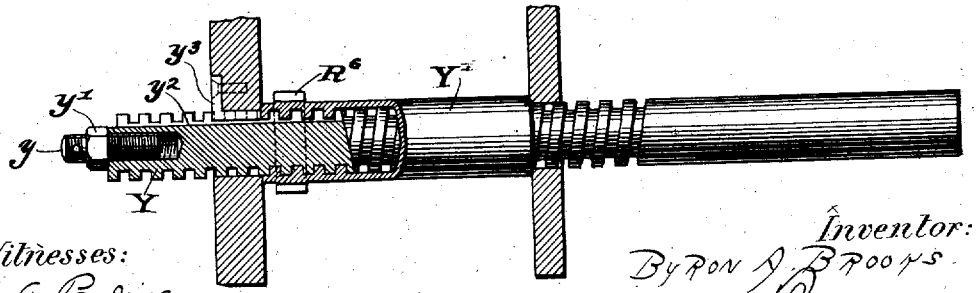
Figure 14:
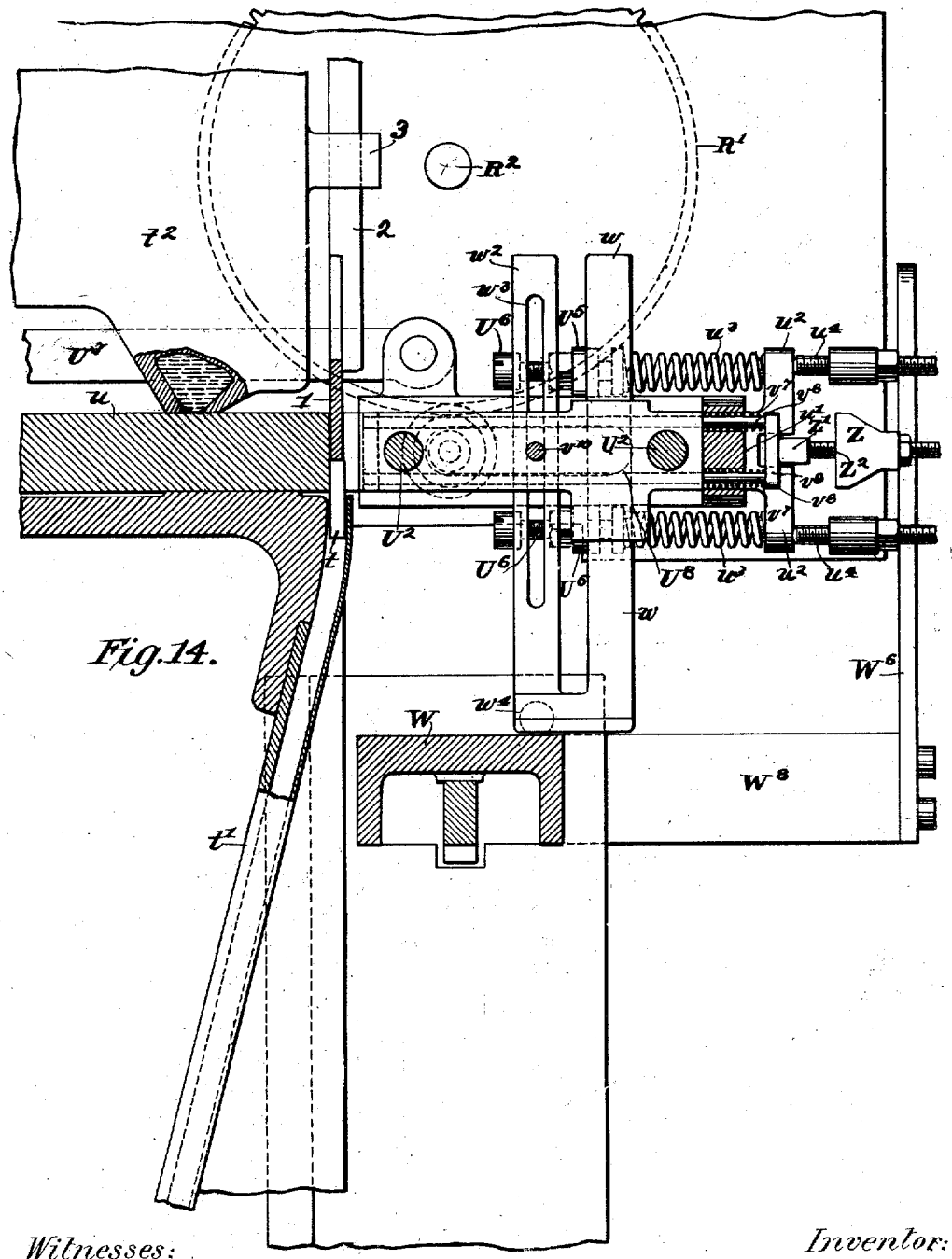
Figure 18:
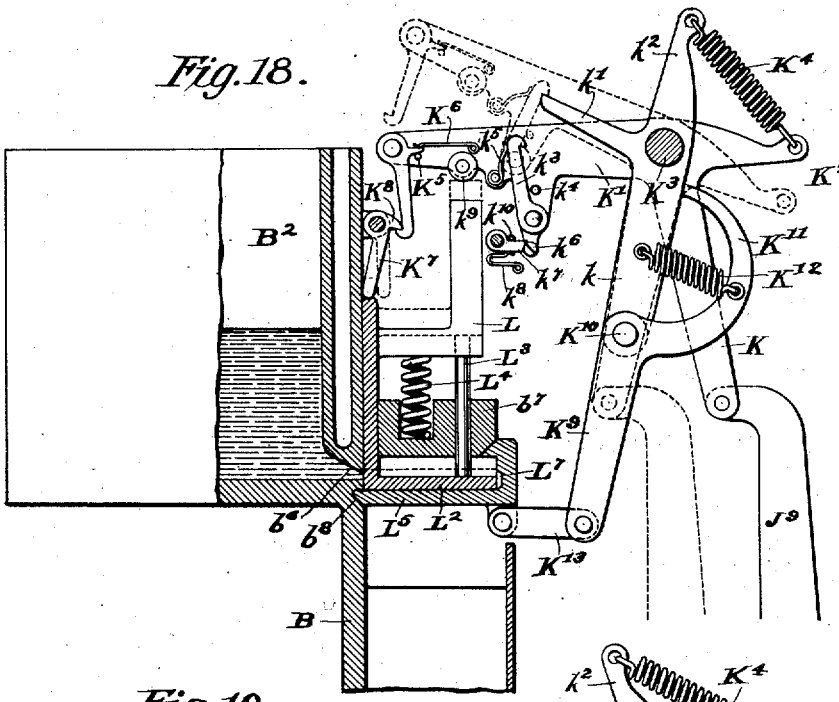
Figure 19:
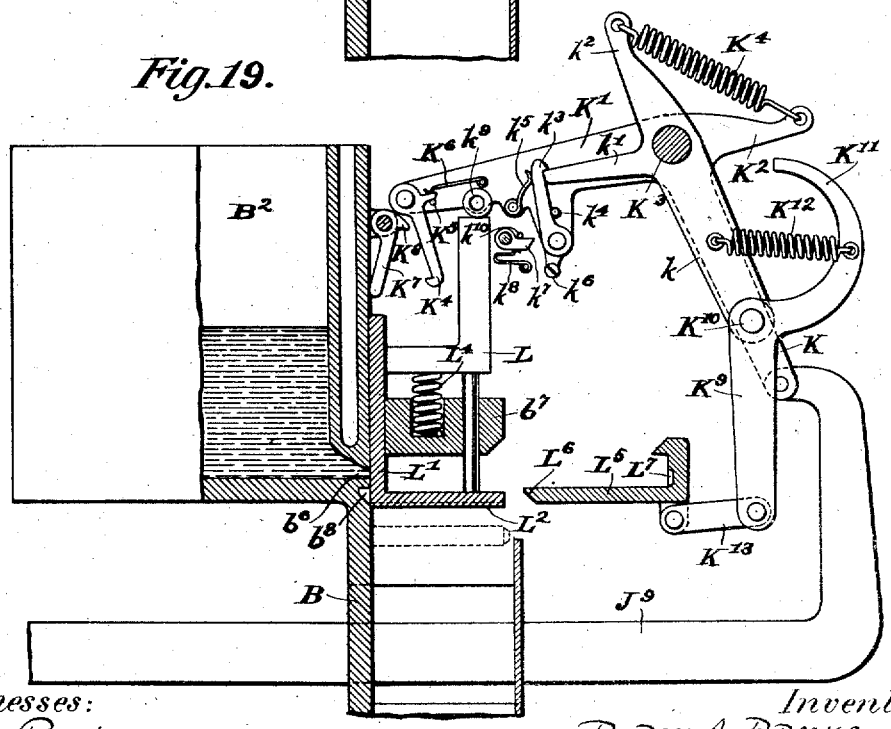
Figure 20:
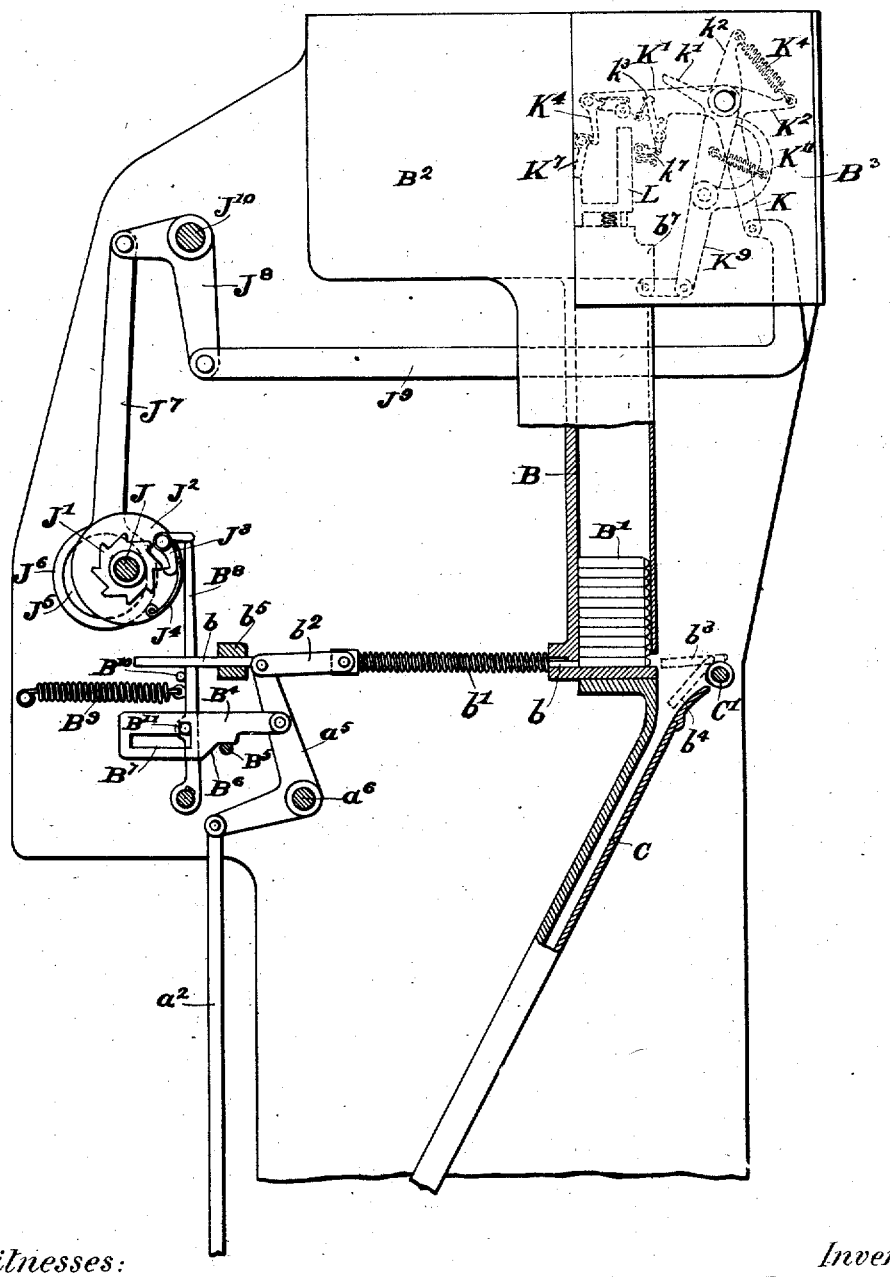
Figure 23:
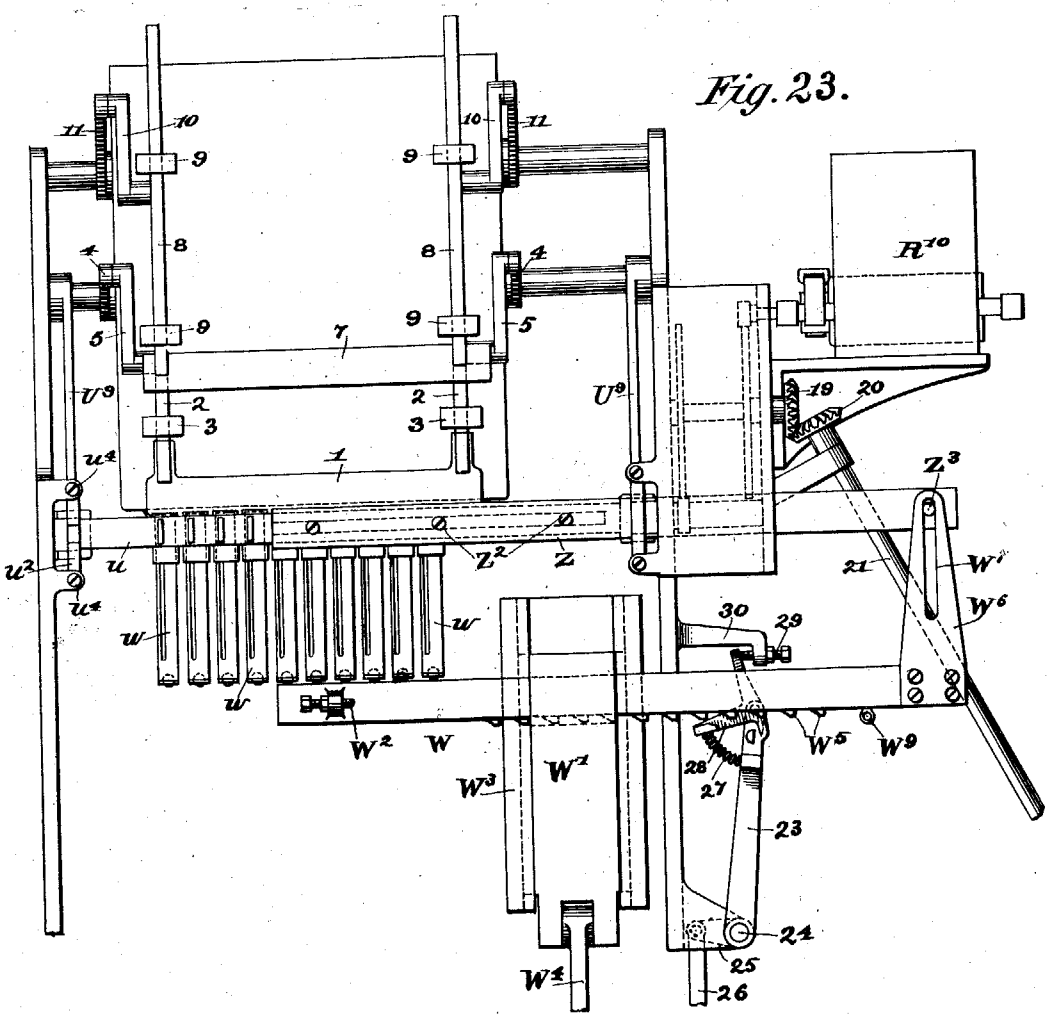
Figure 21:
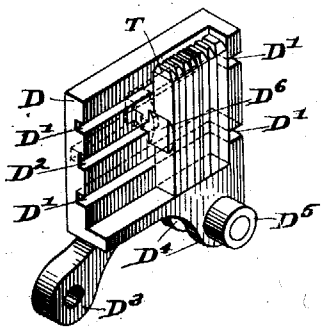
Figure 22:
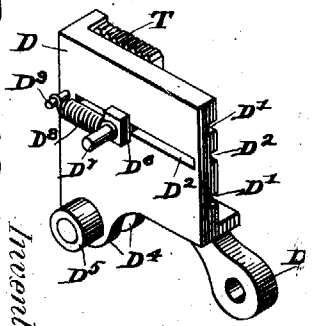
Figure 24:
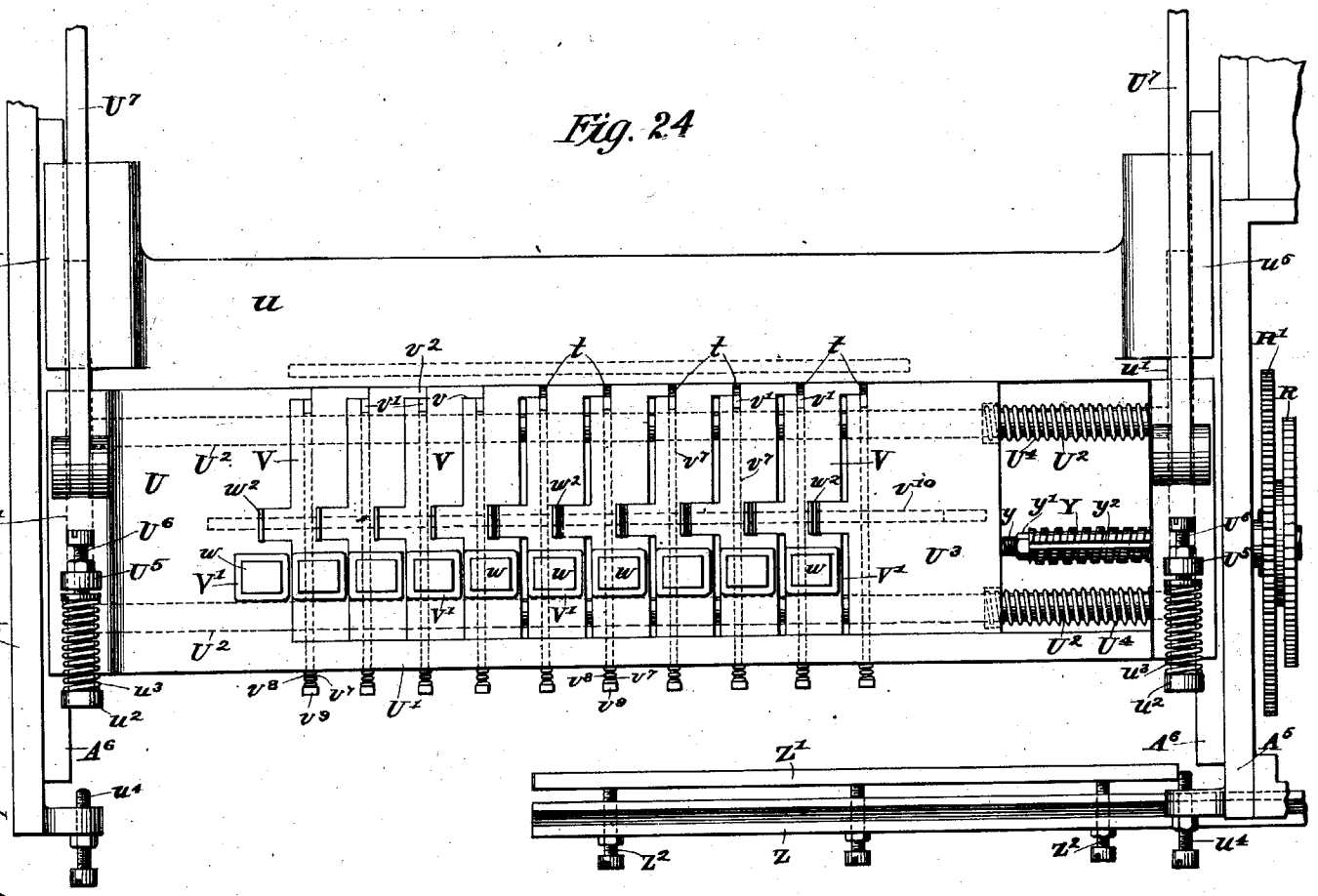
Figure 26:
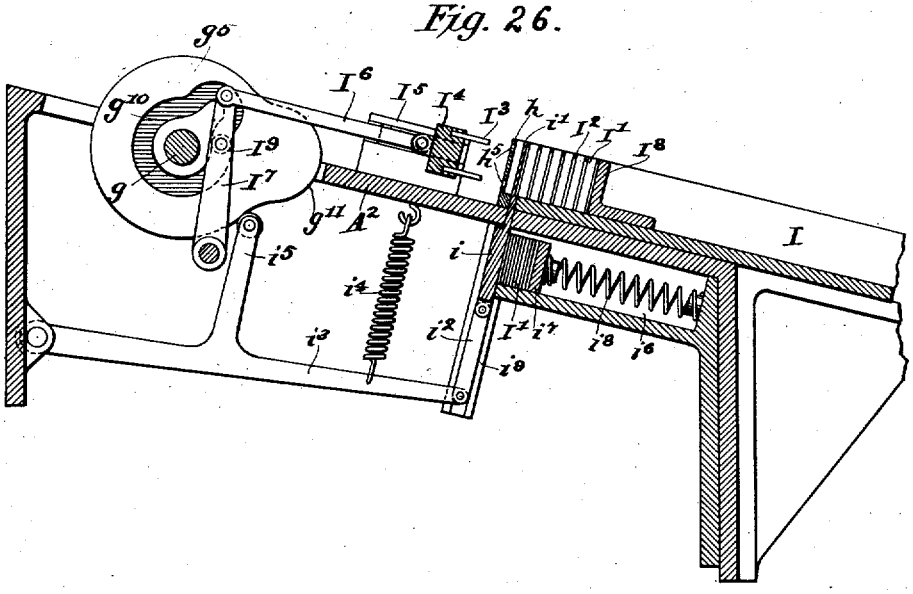
Figure 25:
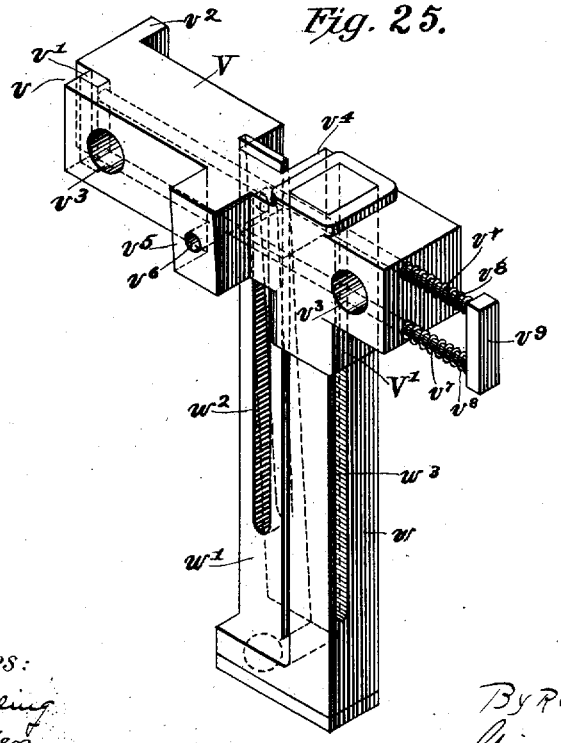
Figure 29:
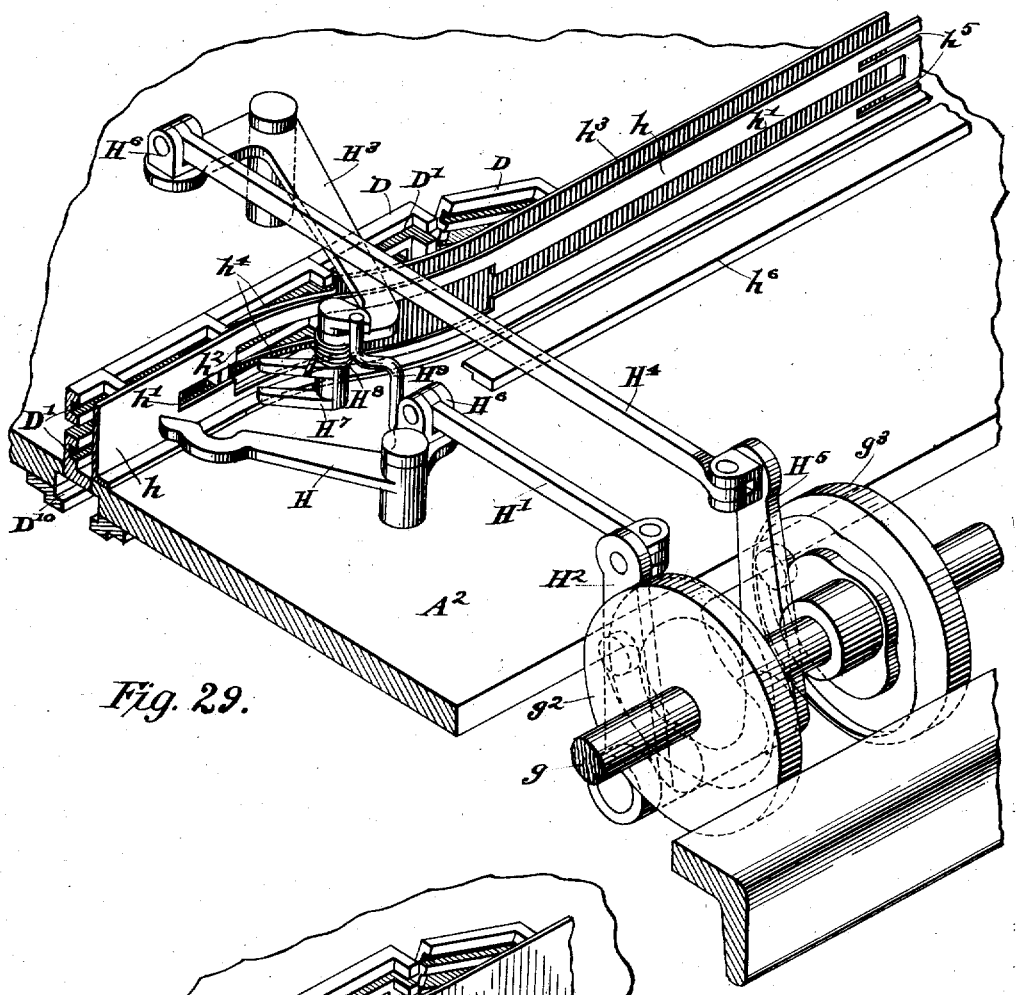
Figure 30:
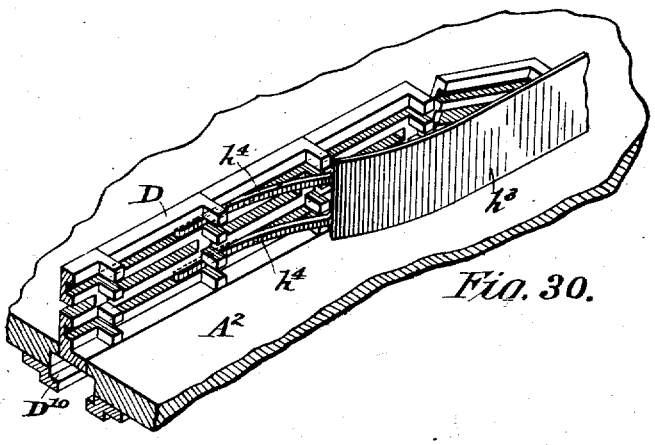

Figure 1 is a front elevation of my device. Fig. 2 is a side elevation of my device. Fig. 3 is a sectional elevation of the mechanism used for feeding the type receivers or carriers. Fig. 4 is an elevation, partially in section, of the mechanism shown in Fig. 3, but taken at right angles thereto. Fig. 5 is an elevation of the same mechanism as shown in Fig. 3 with the parts in different positions. Fig. 6 is a sectional elevation through the same mechanism, taken at right angles to Fig. 5. Figs. 7 and 8 are elevations showing the mechanism by which the space occupied by each type is measured. Fig. 9 is a diagrammatic view showing the electrical connections by which said type-measuring mechanisms are controlled. Fig. 10 is a side elevation of one of the sprocket-wheels over which the type-carrier passes and said type-carrier, together with the mechanism for properly placing the type in the carrier. Fig. 11 is a plan view of the same mechanism. Fig. 12 is a plan view of the mechanism for operating and controlling the type-measuring device. Fig. 13 is a plan and partial section of the threaded belt by which the measuring of the space occupied by the type is accomplished. Fig. 14 is a side elevation and partial section of the mechanism by which the space-casting molds are operated. Figs. 15 and 16 are similar views showing the parts in different positions. Fig. 17 is a front elevation of one of the sprocket-wheels, a portion of the type-carrier, and the tubes by which the spaces are inserted in the carrier. Figs. 18 and 19 are sectional elevations showing the mechanism for operating the type-casting device. Fig. 20 is a side elevation showing the type-reservoir and one end of the type-delivering tube in section and the mechanism for operating the type-casting devices. Figs. 21 and 22 are perspective views showing in detail the construction of one of the links in the type-carrier. Fig. 23 is a front elevation of that portion of the machine containing the space-casting and adjusting or justifying mechanisms. Fig. 24 is a plan of the space-molds and the justifying mechanism. Fig. 25 is a perspective view showing in detail one of the bars forming the space-mold and one of the justifying wedges or bars which are operated in connection therewith. Fig. 26 is a sectional side elevation of the mechanism for inserting the leads between the lines of type. Fig. 27 is a plan view showing the mechanism for transferring the line of type from the carrier to the galley. Fig. 28 is a detail of a portion of this mechanism, illustrating the operation of the switch at the point of transference from the carrier to the guide leading to the galley. Fig. 29 is a perspective view showing the mechanism used in transferring the line of type from the carrier to the said guide. Fig. 30 is a perspective view showing in detail the switch which lies at one side of said guide, and Figs. 31, 32, 33, 34, 35, and 36 illustrate diagrammatically the various steps in the formation of a line of type and its transference to the galley.

The machine illustrated in the above drawings is designed to cast the various types required separately from each other, to assemble them in words and lines, and automatically transfer them to the galley, at the same time properly justifying and leading the same. The general principle on which this machine works is that a series of reservoirs are provided, one for each type or character which is to be used, said reservoirs each normally containing a certain number of types representing these characters and being supplied with a new type by the casting mechanism whenever one of the types is removed from said reservoir. The type receiver or carrier is provided with separate compartments or recesses, each of which is designed for containing the type for any given word, and the various words for a line are to be inserted in said carrier before the spaces between the words are to be inserted, whereupon the amount of space which remains to be filled by said spaces is automatically measured, the space-molds adjusted to correspond with this amount, the spaces cast and then inserted in the word-carriers, whereupon the type forming the entire line is removed from the carriers and spaced upon the galley. This involves that the word-compartments in the type receiver or carrier have a length sufficient to accommodate the longest word and that the space occupied by the type set up be measured, so that more or less words be set up as needed to fill out the line. The type after having been used may be melted or otherwise disposed of, as desired, as new type are constantly being automatically cast by the machine to replace the type removed from the reservoirs.

The type-carrier is a flexible compartment-carrier made as an endless belt and adapted to pass about guide-wheels. This belt, as herein shown, is in the form of a chain, each link of the chain having a separate compartment secured thereto. Obviously the carrier might be made as a belt having a series of blocks secured thereto and constructed otherwise like the links described. This is deemed to be an equivalent construction. One of these links is shown in perspective in Figs. 21 and 22 removed from the remainder of the mechanism. It will be seen that this link D resembles a box which is open at three sides, said box being of such a size as to conveniently contain the type therein in a vertical position and should be of such a length as to accommodate the type for the longest word which is likely to be used. This link is provided at one end with a lug $D^3$, which is provided with a pivot-hole and is adapted to engage with the two lugs $D^4$, placed upon the opposite end of the adjacent link, the two being secured together by means of a pivot-pin and a number of these forming the chain or belt which constitutes the type-carrier. Upon the projecting pivots connecting the individual carriers or links which form the belt are placed rollers $D^5$, which are adapted to engage in notches $E^2$, (see Figs. 6 and 10,) formed in the periphery of the two disks or sprocket-wheels E and $E^{10}$, upon which the carrier-belt is mounted. The individual carriers or links are provided with two longitudinally-extending slots $D'$, extending through the end wall of the type-receiving space and preferably beneath the surface of the side wall, as shown in Figs. 21 and 22. These grooves are adapted for the reception of the points $h^4$ of the switch $h^3$, (see Figs. 28, 29, and 30,) by means of which the type are removed from the carriers in the progress of the carriers past the switch. The carriers are also provided with a type-retaining finger for holding the type in place after insertion. A central longitudinally-extending slot $D^2$ passes entirely through the side wall of the carrier, but stops short of the ends thereof, forming a guide for the type-retaining finger $D^6$, which is mounted to slide in this slot and is provided with a pin $D^7$, extending through the back of the carrier and connected, by means of a small spring $D^8$, with a pin $D^9$, which is secured to the opposite end of the carrier. The spring $D^8$ is so proportioned as to hold the finger against the last type placed in the carrier and to hold the type in proper vertical position. It is not, however, brought into use until all the type for a word have been assembled, being held out of action during the assembling of the type by means hereinafter described. A large number of these links or individual carriers are assembled together to form a chain, as illustrated in Figs. 10 and 17. The sprocket-wheel E, which is herein shown as at the right-hand end of said belt, is the wheel by which motion is communicated to the carrier-belt, the wheel $E^{10}$ at the opposite end being an idler. This wheel and the mechanism for operating the carrier-belt is shown in Figs. 3, 4, 5, 6, 10, and 11. The manner of operating the carrier-belt is best illustrated in Figs. 3, 4, 5, and 6. A short shaft $E'$ is suitably journaled in the frame and has the sprocket-wheel E secured thereon. Mounted loosely upon the same shaft is a disk $E^3$ and a belt-wheel $E^4$, between which is placed a clutch mechanism consisting of two sleeves $e$ and $e'$, the sleeve $e'$ being placed outside of the sleeve $e$ and secured thereto by means of a key $e^3$, so that the two must turn together, but are free to slide lengthwise of each other. The inner sleeve $e$ is also keyed to turn with the shaft $E'$, but is free to slide lengthwise thereon. The sleeve $e$ has upon one end thereof a disk forming one-half of a friction-clutch device $E^5$, which engages the surface of the disk $E^3$, so as to turn the same. Upon the same end of the sleeve $e$ is secured a ratchet-wheel $E^7$, which is shown in dotted lines in Figs. 3 and 5 and in section in Fig. 6. The opposite end of the outer sleeve $e$ is similarly engaged with the adjacent surface of the belt-wheel $E^4$ by means of a friction device $E^6$. The belt-wheel $E^4$ has a belt $E^{12}$ passing about the same and is constantly rotated. The disk $E^3$ and belt-wheel $E^4$, with the mechanism included between them, are held in position upon the shaft by means of fixed collars $e^4$.

It will be seen that if the disk $E^3$ be held against rotation and the ratchet-wheel $E^7$ be released the shaft E′ may be turned without turning the disk $E^3$, or if the disk and ratchet-wheel both be permitted to revolve the shaft E′ and the sprocket-wheel E, which is secured thereto, may be turned.

In operation the disk $E^3$ is held against rotation, while the ratchet-wheel $E^7$ is permitted to turn a sufficient amount to advance the carrier-belt a distance corresponding to the length of one of the individual carriers or links, thus securing the word-feed, while after the carrier has been advanced a sufficient amount so as to contain all the words necessary to fill up a line the disk $E^3$ is released, and the shaft is given a complete rotation, the same being sufficient to advance the carriers an amount equal to the maximum number used for a single line. In other words, the carriage is advanced a space of one of the individual carriers or holders after each word is set up, and after the words forming the line have all been set up the carriage is advanced a distance corresponding with the length of the maximum number of carriers which would ordinarily be used in setting up a line.

Secured to the side of the disk $E^3$ is an escapement $E^8$, which is normally held with its upper end in engagement with the ratchet-wheel $E^7$ by means of a spring $E^{11}$. (Shown in dotted lines in Figs. 3 and 5 and in full lines in Fig. 4.) Mounted to slide in suitable guides in the frame is a bar or link $M^2$, which has a pawl M pivotally secured thereto and adapted to engage a pin $E^{10}$, which projects laterally from the central rearward extension of the escapement $E^8$. This pawl is held in engagement with said pin by means of a spring $M^4$ or other suitable device. Its lower extension also engages a stop-pin $M^3$, carried by the link $M^2$. If the bar $M^2$ be pulled downward, the upper end of the escapement $E^8$ will be freed from the tooth of the ratchet-wheel and the lower end be brought into engagement with the ratchet-wheel, thus permitting the ratchet-wheel to be advanced one-half a tooth-space. When the bar returns to its upper position, the lower end of the escapement will be freed from the tooth of the ratchet-wheel and the upper end be brought into engagement therewith, thus permitting the wheel to be advanced another half-tooth space, so that the wheel is advanced a complete tooth-space for each complete reciprocation of the bar $M^2$. The bar $M^2$ is connected with the space-bar of the operating mechanism, so that a depression of the space-bar results in the advance of the type-carrier an amount equal to the length of one of the individual carriers, thus presenting a new carrier to the type-delivery tube. The number of teeth in the sprocket-wheel $E^7$ will be made to correspond to the maximum number of words which will ordinarily be placed in a line of type. As shown in Figs. 3 and 5, twelve teeth are employed, and consequently twelve words may be set up for each line of type. This number may, however, be varied, as desired, between different machines, while the number used for any line will depend upon the length of the words composing the line, being less where long words are used and more for shorter.

The keyboard for operating the device may be of any desired construction, one form being shown in Figs. 1 and 2. The space-bar $M^7$ is therein shown as placed in front of and beneath the keys representing the different characters. This space-bar is operated between each word in the same manner as the space-bar of a type-writer. The space-bar is mounted upon two levers $M^6$, which extend to the rear portion of the machine, being pivoted upon a rod or shaft 31. The bar $M^2$, by which the escapement is operated, is connected with one of the levers $M^6$ by means of a link $M^5$, as clearly shown by dotted lines in Fig. 2.

Referring to Fig. 10, the belt or carrier is therein shown in the position of rest or that which it would occupy at the time of filling one of the individual carriers or holders. The type are delivered through a tube $C^2$, which is located immediately over the rear end of the carrier. The type-holding finger $D^6$ is temporarily held to the extreme right end of the carrier by means of a catch or detent pin $d^7$, which projects through the table $A^2$ and is surrounded by a spring $d^8$, which normally tends to hold it downward. A suitable stop is provided which limits the downward position of this pin, so that the lateral extension at the upper end of this stop-pin is in position to engage the pin $D^7$, which projects rearward from the carrier and which forms a part of the finger $D^6$. The finger $D^6$ is thus held to the rear end of the carrier until all the type which are to be placed in said carrier are in position. It is then released by momentarily raising the catch or detent pin $d^7$ by means of the mechanism which operates the carrier-feed and which will be hereinafter described, so as to permit the spring $D^8$ to draw the finger against the last type inserted, and thus to hold them all in position. In the lower end of the catch-pin $d^7$ is a threaded bolt $d^9$, which is provided with a lock-nut $d^{10}$, so that the effective length of the pin may be varied as desired to adjust it to the proper position. The lower end of this pin is engaged by an arm $d^{11}$, which is secured at one end of a short shaft $e^{11}$. Upon the opposite end of this shaft are secured three arms $e^7$, $e^8$, and $e^{10}$. (Best shown in Figs. 3 and 5.) The arm $e^8$ has a small roller $e^9$ journaled in its outer end and normally resting in a notch $E^{13}$, formed in the periphery of the disk $E^3$. A lever $e^6$ is pivoted at $e^5$ and at one end has a pin engaging the short arm $e^7$, which is secured to said shaft $e^{11}$. At its opposite end this lever has a laterally-projecting pin engaging the lower end of the short lever or pawl $m$, which is pivoted upon the upper end of the bar $M^2$. The opposite end of the pawl $m$ engages with a fixed pin $m'$, which is supported upon an arm extending from the frame. A spring $m^2$ acts upon said pawl or lever, so as to hold it in engagement with the pin $m'$. The lever $e^6$ is engaged by a spring $e^{13}$, which holds it in the position shown in Fig. 3. When the bar $M^2$ is pulled downward by the operation of the space-bar, it engages the lever $e^6$ by means of the pawl $m$, so as to throw upward the arm $e^7$, and thus to elevate the arm $d^{11}$ and the catch-pin or detent $d^7$.

During the operation of the word-feeding mechanism the disk $E^3$ is held against rotation by the catch or detent $O^4$, and consequently the roller $e^9$ is permitted to drop back into the notch $e^{13}$ as soon as the bar $M^2$ rises. In consequence the stop-pin $d^7$ is only momentarily held in a raised position, the time being sufficient only to permit the pin $D^7$, which forms the rearward extension of the type-retaining finger, to be drawn forward, so as to engage the type. The stop-pin $d^7$ is then immediately returned to its normal position, where it will engage the pin $D^7$ of the next carrier as the belt is advanced. The type as assembled in the carrier are pressed toward the forward end thereof by a mechanism which is shown in Figs. 10 and 11 and which is set in operation by the operation of any one of the ordinary keys of the keyboard. This mechanism will be hereinafter described in detail.

The keys A are mounted upon bars $a$, which are pivoted upon transversely-extending rods or shafts $a'$. At their rear ends they are each connected to a rod $a^2$, which extends upwardly and is connected with one end of a bell-crank lever $a^5$, which is mounted upon a transversely-extending shaft $a^6$. This mechanism and the further mechanism which will be now described for the selection and casting of a type it is understood is duplicated for each character or type which is to be used in the machine. Both the type selecting and assembling mechanisms and the type-casting mechanisms for each individual character are separate and distinct, but are connected with a common operating member, as the bell-crank lever $a^5$, so that they are both operated by the depression of the corresponding key. The characters as cast are deposited in the reservoirs for the type-setting mechanisms, and no character is cast except to replace a character previously withdrawn from a type-reservoir. The type are contained in reservoirs B, which are placed in the upper portion of the machine and are of such width as to receive one layer of the type, the type B′ being superposed after the manner shown in Fig. 20. At the lower end of the reservoir is a side opening of such size as to permit the expulsion of one type. At the rear end of the type is an opening which receives a rod $b$, by means of which the type is engaged and expelled. This rod $b$ is mounted to slide in a suitable guide $b^5$ and is connected, by means of a link $b^2$, with one end of the bell-crank lever $a^5$. A coiled spring $b'$ surrounds the rod and normally holds it in its withdrawn position. When the key representing any particular character is depressed, the corresponding bell-crank lever $a^5$ is operated so as to force its connected rod $b$ forward, thus ejecting one of the type B′. The forward end of this type strikes upon a roller C′ in the position shown by dotted lines at $b^3$. It then drops down in the position shown by dotted lines at $b^4$ and then starts down its type-delivery tube C. These tubes all converge to a common tube $C^2$, which has been previously described as lying immediately above the individual carrier which is being filled.

Lying immediately above the reservoir B is a reservoir $B^2$, which contains molten type-metal and from which the new type is cast which replaces the one just removed. This reservoir and the mechanism for easting the type is shown in detail in Figs. 18 and 19 and is common to all the type-molds. This reservoir and its contents are kept hot by any suitable means. The mechanism for setting these parts in operation is, however, shown in Fig. 20.

Connected with the bell-crank lever $a^5$ is a bar or plate $B^4$, which rests upon a fixed rod or pin $B^5$. This plate has a slot $B^7$, which at its forward end has a slight upward extension adapted to accommodate a pin $B^{11}$, carried by a pivoted arm $B^8$. The plate $B^4$ has an inclined portion $B^6$ located immediately back of the rod $B^5$, so that when the plate is drawn forward it will be raised a sufficient amount to free the pin $B^{11}$ from the upward extension of the slot $B^7$. This will, however, not occur until the pin $B^{11}$ and the arm $B^8$, which carries it, is drawn forward a slight distance. The arm $B^8$ is normally held rearwardly by means of a spring $B^9$ against a stop $B^{10}$. Extending entirely across the upper portion of the machine is a shaft J, which at one end has a belt-pulley $f^8$, by which the shaft is constantly rotated. Upon the shaft J is a tooth or rachet wheel J′, which is also constantly rotated. Loosely mounted upon the shaft J is a disk $J^2$, which carries a pawl $J^3$, one arm of which normally engages the upper end of the arm $B^8$, so as to hold its toothed end free from the toothed wheel J′. The toothed end of the pawl $J^3$ is engaged by a spring $J^4$, which tends to throw it into engagement with the teeth of the wheel J′. Secured to the side of the disk $J^2$ is an eccentric $J^5$, upon which is an eccentric-strap $J^6$, connected with a link $J^7$, the upper end of which is connected with one end of a bell-crank lever $J^8$, loosely mounted upon a cross-shaft $J^{10}$. When the bell-crank lever $a^5$ is operated to eject a type, the arm $B^8$ is moved to the right a sufficient distance to free the pawl $J^3$, and thus to lock the disk $J^2$ to the toothed wheel $J'$. This will revolve the eccentric $J^5$ and vibrate the bell-crank lever $J^8$. As the bell-crank lever $a^5$ returns immediately to its normal position under the influence of the spring $B^9$, the arm $B^8$ will be drawn back into such position that it will engage the arm of the pawl $J^3$ to release it from the toothed wheel $J'$ at the completion of one revolution. The bell-crank lever $J^8$ is thus given one complete vibration and then stopped. This bell-crank lever is connected at one end with a rod $J^9$, which extends forwardly and which is connected with the mechanism for operating the type-casting device. This mechanism is clearly shown in Figs. 18 and 19. It is evident that the rod $J^9$ might be directly connected with the eccentric-strap $J^6$, and thus dispense with the bell-crank lever $J^7$.

The reservoir $B^2$, which contains the molten type-metal and which is heated by any suitable means, has an orifice $b^6$ located at its forward lower corner. This orifice is normally closed by a slide L, which has a portion L', closely engaging with the forward surface of the reservoir and covering the opening $b^6$. This slide has a bottom portion $L^2$ extending forwardly and adapted to form the upper surface of the type-mold. Just beneath the discharge-opening for the molten metal is a recess $b^8$, adapted to receive the end $L^6$ of a removable plate which forms the bottom portion of the type-mold, thus insuring the proper registry of said plate. The slide L is acted upon by a spring $L^4$, which tends to raise it so as to uncover the discharge-opening $b^6$ and permit the metal to flow out thereat. This slide is normally held downward, or in the position shown in Fig. 19, by engagement of a roller $k^9$ with its upper end, said roller being carried by a lever which has three prongs K, K', and $K^2$. This lever is pivotally mounted upon a cross-shaft $K^3$ and at its lower end is pivotally connected with one end of the bar $J^9$. Pivotally mounted upon the same shaft $K^3$ is a second three-prong lever, consisting of the arms $k$, $k'$, and $k^2$. The two arms $K^2$ and $k^2$ are connected by a spring $K^4$, which tends to draw them together. The arm $k'$ engages with the toothed end of a pawl $k^3$, which is pivoted upon the arm K'. This pawl is engaged by a spring $k^5$, which holds it toward the arm $k'$, and a stop-pin $k^4$. The pawl has a lower extension carrying a pin $k^6$, which is adapted to engage the end of a pawl $k^7$, pivoted upon the frame, and is normally held raised by a spring $k^8$ against a stop-pin $k^{10}$. When the lever-arm K' is raised, the pin $k^6$ will engage the pawl $k^7$, so as to swing the pawl $k^3$ backward, and thus free the arm $k'$. This permits the spring $K^4$ to draw the two arms $K^2$ and $k^2$ toward each other, or into the position shown by full lines in Fig. 18. This also permits the spring $K^{12}$ to draw the end $K^{11}$ of the arm $K^9$ toward the arm $k$ until the two engage, as shown by the full-line position in Fig. 18. The lever $K^9$ is pivoted upon the lower end of the arm $k$. The lower end of the lever $K^9$ is connected, by means of a link $K^{13}$, with the plate $L^5$, forming the lower portion of the type-mold. This plate is of an L shape and is provided at $L^7$ with a die adapted to form the type-surface. A suitable stop is provided which will prevent the withdrawal of the plate $L^5$ beyond a certain position corresponding substantially with that shown in Fig. 19.

At the beginning of the reciprocation of the rod $J^9$ and the levers K and $k$ the slide L will be raised, under the influence of the spring $L^4$, to the position shown in full lines in Fig. 18. At this point it is stopped by contact of its upper end with the stop-pawl $K^7$, which is pivoted upon the forward face of the type-metal reservoir. This pawl has a small arm $K^8$, which is adapted to be engaged by the hook at the lower end of the pawl $K^4$, which is pivoted at the outer end of the arm K'. A spring $K^6$ is provided which will throw this pawl toward the arm $K^8$ and secure engagement therewith when the pawl $K^4$ rises. A stop-pin $K^5$ is also provided, limiting the swing of the pawl $K^4$ toward the reservoir. The first step in the operation of this device is to raise the slide L to the full-line position of Fig. 18. Immediately following this the plate $L^5$, which is to form the lower portion of the type-mold, is advanced toward the position shown in Fig. 18. When the slide L contacts with the stop-pawl $K^7$, the plate $L^5$ advances beneath the lower portion $L^2$ of said slide, or into the position shown by full lines in Fig. 18. After the plate $L^5$ is in the casting position the pawl $K^4$ engages with the arm $K^8$ on the stop-pawl $K^7$, so as to throw the same outward into the dotted position shown in Fig. 18. This permits the spring $L^4$ to quickly raise the slide into the dotted position shown in Fig. 18. This uncovers the opening $b^6$, and the type-mold formed by the lower portion $L^2$ of the slide and the plate $L^5$ is filled with the molten metal. The latter part of the advance of the plate $L^5$ is rapidly performed by reason of the release of the arm $k'$ by the pawl $k^3$ and the action of the spring $K^4$ between the two levers. When the arm K' reaches its uppermost position, as shown by the dotted lines in Fig. 18, the pawl $k^3$ engages the arm $k'$, as shown by the dotted lines, so that when the return movement of said levers commences the arm K' and its connected members are returned with the main lever. The plate $L^5$ is thus withdrawn from beneath the type which has just been cast. Just prior to the completion of the return movement of said levers and after the plate $L^5$ has been fully withdrawn the roller $k^9$ engages the upper end of the slide L and forces it downward, the lower inner corner of said slide acting as a cutter to sever the type from the body of the reservoir B. The mechanism just described is duplicated for each character used upon the machine, and one of said characters is cast whenever one of the characters is removed from the bottom of its reservoir, the reservoir being thus kept constantly supplied with a certain number of characters.

The shaft J extends across the upper rear part of the machine and at one end has a pulley $f^5$, loosely mounted thereon and provided with means for temporarily connecting it to revolve with the shaft similar to the means described in connection with the wheel J'. This is operated to lock the wheel to the shaft during one revolution by means of a link which is connected with a rod extending transversely beneath the key-levers and actuated by any one thereof in a manner similar to the carriage-feeding mechanism of type-writers. A belt $f^3$ extends from the pulley $f^5$ over guide-pulleys $f^4$ and $f^6$ to a pulley which is secured to rotate with a cam-disk $f^2$, mounted above the table of the machine adjacent to the type-delivery tube $C^2$.

A bell-crank lever $f'$, pivoted upon a standard $A^3$, has one end engaging the cam-groove in said disk and its other end connected with a link $f$, which is also connected with a slide F, mounted to reciprocate above the table in guides F'. The lower end of the type-delivery tube $C^2$ has one side cut away and replaced by a spring $C^3$, which is under tension, so as to spring outward or so as to permit the discharge of the type. Pivoted upon a standard $C^6$ alongside of the delivery-tube is a bell-crank lever $C^4$, one end of which engages the spring $C^3$, so as to press it inward and close the delivery-tube a sufficient amount to prevent the escape of the type. A spring $C^5$ tends to throw the lever $C^4$ backward or away from the type-delivery tube. The other end of the bell-crank lever engages a projection $F^2$ upon the slide F, so as to press the opposite end of the lever against the spring-plate $C^3$. Whenever one of the type-bars is depressed, the pulley $f^5$ is given one full turn, as is also the cam-disk $f^2$, which is connected with it. This causes a reciprocation of the slide F, one result of which is to open the lower end of the type-delivery tube to permit the type contained therein escaping into the carrier.

Mounted to slide upon guides $d'$ upon the table and extending in the same direction as the carrier is a block $d$. (See Figs. 1, 10, and 11.) This block has a slot extending transversely thereof and containing a second block $d^2$, said block being provided with a slot $d^3$, adapted to register with a hole $d^5$, extending transversely through the block $d$ at right angles to the direction of movement of the block $d^2$. The block $d^2$ has a pin $d^6$ extending upwardly and into a slot $F^9$ formed in the slide F. It also has two pins $d^4$ extending forwardly and into the grooves D' in the carrier. These pins are separated sufficiently to pass at either side of the type-retaining finger $D^6$ of the carrier and will therefore not interfere with said fingers at any time.

The slide F has a lug or arm $F^4$ extending downwardly therefrom and carrying a rod $F^5$, which extends parallel with the direction of movement of the slide and which at its outer end has a collar $F^7$, mounted loosely thereon. This collar or washer is engaged by a spiral spring $F^6$, which surrounds said rod, and is thus yieldingly held at the outer end of the rod. This rod is in such position that it will enter the hole $d^5$, formed in the block $d$, and the slot $d^3$ in the block $d^2$. The block $d$ is provided with a friction-spring which will resist motion of the block in either direction until actuated by a force superior to the resistance of the spring.

At each reciprocation of the slide F, which is caused, primarily, by the operation of one of the type-bars and directly by the cam $f^2$, the slide F will by the action of the inclined portion $F^8$ of the slot $F^9$ engage the pin $d^6$, so as to project the block $d^2$ and the pins $d^4$, carried thereby, into the slots D' of the carrier and back of the type which has just been introduced thereto. By the engagement of the washer F with the edge of the block $d$ said block is moved forward, thus carrying the pins $d^4$ and the type in the carrier toward the left-hand end of the carrier. As this movement is caused by the spring $F^6$, it will accommodate itself to the varying amount of type in the carrier, stopping gradually sooner as the type accumulates in the carrier. The spring $F^6$ is sufficiently strong to be able to overcome the friction-spring which acts upon the block $d$ to hold it in place. Upon the return movement the friction-spring, which is secured to the block $d$, prevents the backward return of the block until the pin $d^6$ reaches the left-hand end of the slot, as shown in Fig. 11. This results in first withdrawing the block $d^2$ and the pins $d^4$, carried thereby, from the slots in the carrier and then in the return of the block to its normal position. This mechanism therefore results in inserting the pins $d^4$ into the slots in the carrier, moving them along said slots, so as to carry the type along to the left-hand end of the carrier, withdrawing said pins from the slots in the carrier, and then returning them to their initial position. This operation is caused at each operation of one of the type-bars and after each type has been inserted in a carrier.

When the type for any particular word has been assembled in the carrier, the space-bar is operated, which in the manner previously described causes the carrier-belt to be advanced one line-space, thus bringing a new carrier beneath the type-delivery tube. This operation is carried on until all the words of a particular line have been set up in the carrier.

The machine is designed for setting up a line with a certain maximum number of words, said number being variable, according to the circumstances. This variation is, however, provided for at the time the machine is built. This number is taken large enough to accommodate the maximum number of words which is likely to be inserted in the usual line-space. When this number of words or the line-space has been filled, the carrier-belt is advanced a distance corresponding with said maximum number of words, so as to bring the various carriers which have received their types beneath the space-delivering tubes, so as to receive the spaces which separate the words in the completed line.

During the operation of assembling the type in the carriers the space occupied thereby is automatically measured and the spaces which are cast are so proportioned as to exactly take up this space. The space-molding device is shown in Figs. 14, 15, 16, 23, and 24, and one of the blocks forming the mold is shown in perspective in Fig. 25.

Two plates U and $u$, which form the frame for holding the molds proper, are mounted to slide upon guides $A^6$ at the side of the machine-frame. These plates are shown in section in Figs. 14, 15, and 16, which are sectional elevations of the space-molding mechanism. Two rods $U^2$ extend from one end of the plate U to the other, connecting the end portions thereof. The central portion of this plate is mainly cut away to accommodate the blocks V, one of which is shown separately in Fig. 25. The plate $u$ has two arms $u'$ extending forward one from each end thereof and terminating at their forward ends in two arms $u^2$, extending upwardly and downwardly and opposite two lugs $U^5$, formed upon the ends of the plate U. Between the lugs $U^5$ and the arms $u^2$ are placed coiled springs $u^3$, which tend to separate the arms and lugs, but to draw the plates together. These springs, while normally holding the two plates U and $u$ together, permit the separation thereof whenever sufficient power is applied. These plates are reciprocated upon the guides $A^6$ by means of links $U^7$, which are connected to the ends thereof and are operated by suitable mechanism, to be hereinafter described. The power is therefore applied directly to the plate U, and the plate $u$ is moved by means of springs $u^3$, so that if a fixed body be engaged with the plate $u$ during the forward motion the said plate $u$ will be stopped, while the plate U continues its travel.

The blocks V, which in connection with the front face of the plate $u$ form the mold proper, are provided at one of their inner or rearward corners with a notch $v$, and at the inner corner of this notch a slot extends toward the center of the block, within which is placed a small block $v'$, designed to act as an ejector for the space when cast. This block is connected at top and bottom with two rods $v^7$, which pass through holes lengthwise of the block V and project from the opposite or outer ends of said blocks. These rods also pass through the front bar U′ of the plate U and are preferably connected by means of a short bar $v^9$. Springs $v^8$ surround the rods and serve to normally hold the block $v'$ into its recess.

In its normal position the outer surface of the block $v'$ is flush with the surface of the notch $v$. Upon the opposite inner corner a flange $v^2$ is provided, which is of the same size as the notch $v$, so that when the different blocks are in contact with each other there is no space left between the outer end of the flange $v^2$ and the surface of the adjacent block. This condition is illustrated by the left-hand portion of the blocks, as shown in Fig. 24. If, however, these blocks be separated, a space is left between the end of the flange $v^2$ and the bottom of the notch $v$ in the adjacent block, which is adapted to act as a mold for casting the space.

At about the center of the length of the block a notch $v^4$ is formed in one side, extending downwardly through the block. Upon the opposite side of the block a lug $v^5$ is provided, which is adapted to fit into the notch $v^4$ of the adjacent block. Through the lug $v^5$ and the body of the block extends a transverse hole $v^6$, which is adapted to receive a rod $v^{10}$, which passes through all of the blocks V. The block is also provided with a collar or sleeve V′, which is herein shown as being of square outline and extending beneath the body of the block. This sleeve is hollow and forms a guide for a portion of the wedge-block. This wedge-block is formed of two main parts, a square bar $w$ and a wedge-shaped bar $w'$, which are separated throughout the greater part of their length and are joined to each other only at their lower ends. The square bar $w$ is preferably provided with a longitudinally-extending slot, forming a spring member $w^3$, which serves to hold the block without shaking in the sleeve V′ and yet permits slight movement thereof, if necessary, while it is being acted upon. The wedge-block $w'$ has a slot $w^2$, within which the rod $v^{10}$ is located, whereby the wedge-block may be raised or lowered without the possibility of its dropping out of place.

The blocks V′ are provided with holes $v^3$ at each end, adapted to receive the rods $U^2$. It is evident that if a number of these blocks one less than the number of words in the line for which spaces are to be provided are separated by forcing the wedges between these blocks the spaces cast in the molds thus formed will all be of the same width, and if the total separation be equal to the difference between the length of the type composing the line and the length of the line the spaces when inserted between the words in the line will make the line of exactly the right length.

The length of the space occupied by the words is automatically measured as fast as the type are set up. This is accomplished by means of the threaded bar Y, which is shown in detail in Fig. 13, and its actuating mechanism. This rod is provided with a longitudinal groove or keyway $y^2$, which is engaged by a key $y^3$, secured to the frame, so that the rod may slide in the frame but cannot turn. Mounted upon this rod and supported against end movement by the frame is a sleeve Y′, which is interiorly threaded, so as to engage with the rod, thus forming a nut. This nut is provided with a pinion $R^6$, by which it may be rotated and the bar be thus projected. The end of the bar is provided with an adjustable bolt $y$, which screws into the same and is provided with a lock-nut $y'$, so that it may be accurately adjusted to vary the length of the rod. The pinion $R^6$ is engaged by a gear-wheel R′, which is shown in elevation in Figs. 7 and 8.

The type used in this machine are arranged on what is known as the "point" system. The various letters are each made of some multiple of a unit's width, being either two, three, four, five, or six units' width. An example of this is shown in Fig. 9, in which "i" is two units in width, "I" is three units in width, "C" is four units in width, "E" is five units in width, and "M" is six units in width. All of the various letters are placed in some one of these groups. Consequently the rotation of the nut Y′ will need to be varied in amount corresponding with the width of the type being set. This variation in amount is secured by the devices shown in Figs. 7, 8, and 9, which will now be described.

Secured to the side of the toothed wheel R′ is the ratchet-wheel R. The proportion of the wheel R′ and the pinion $R^6$ is such that the teeth upon the ratchet-wheel R each represents one unit's space—that is, turning the wheel through one tooth-space will advance the rod Y one unit's space—and when a type is placed in the carrier the ratchet-wheel is turned the number of teeth equal to the number of units in the width of the type. This result is automatically secured, and consequently the amount of space occupied by the line is measured as the line is set up. At the beginning of this operation the end of the rod Y is at a distance from the last movable block in the mold-frame equal to the length of the line, the blocks being closed up by the action of the springs $U^4$. When the type for any line has all been set up, the amount of space which is to be taken up by the spaces between the end words is equal to the space between the end of said block and the end of the rod Y. The means for securing this result is shown in Figs. 7, 8, 9, and 10, Fig. 9 showing diagrammatically the electric controlling mechanism and circuits.

Mounted upon the shaft $R^2$, upon which the ratchet and gear wheels R and R′ are mounted, is a segment $R^3$, which is secured to a lever-arm $R^4$. The lever-arm carries a pawl $R^5$, which is normally held raised from the ratchet-wheel R by means of a spring $R^{11}$. The segment is engaged by a toothed section $R^{12}$, upon a rod $p^7$, which is mounted to slide in guides and is moved under the influence of the bell-crank lever $p^2$, which is connected thereto by a link $p^6$, and of the spring $p^9$. The bell-crank lever $p^2$ is moved by the armature $p$ of a magnet M, which is connected thereto by a link $p'$. The reciprocations of the bar $p^7$ can, however, have no effect upon the wheels R and R′, unless the pawl $R^5$, which is carried by the arm $R^4$, is depressed to engage the ratchet-wheel R. A curved controlling-bar S, which is pivoted at $S^3$, engages by its under surface a pin $S^7$, carried by the pawl $R^5$. The controlling-bar S is normally held raised, as shown in Fig. 7, but is depressed to engage the pawl $R^5$ with the ratchet-wheel R by means of a magnet M′, the armature-lever $p^{10}$ of which is connected to the bar S by a link or rod S′. A stop-pawl $S^4$ is journaled on a fixed pivot and is normally held in engagement with the ratchet-wheel R by a spring $S^5$. This stop-pawl has an arm carrying a pin, which is engaged by an arm $S^2$, projecting from the link S′, so that when the link and pawl $R^5$ are depressed the stop-pawl $S^4$ is freed from the wheel R. This locks the rack-bar $p^7$ to the wheel R and permits the motor turning the wheel backward an amount corresponding with the amount the rack-bar has been advanced, which is equivalent to the width of the type just set. The amount of this advancement is controlled automatically by the magnets $N^2$, $N^3$, $N^4$, $N^5$, and $N^6$ and the mechanism connected therewith, the key-levers being grouped in the circuits of said magnets so as to energize one of them whenever a key is depressed.

Beneath the ends of the type-bars $a$ is a series of bars $a^5$, corresponding in number with the number of sizes of letters used. These bars are insulated from the frame of the machine, and each forms a portion of a circuit to the magnets $N^2$ $N^3$, &c., by means of which the amount of feed of the ratchet-wheel R is determined. A wire N′ extends from one side of a battery X to a portion of the frame. The current passes through the frame and through the pivot-bars $a'$, upon which the type-bars are pivoted, to the type-bars. A number of bars $a'$ are shown, although they might, as far as the electrical circuits are affected, be combined into one bar. The type-bars are provided with springs $a^3$ on their under side, so located as to engage with contact-posts $a^4$, which screw through corresponding bars $a^5$, so that when a spring touches a post the circuit is closed through that key-bar and one of the bars $a^5$. From each of these bars separate wires $n^2$, $n^3$, $n^4$, $n^5$, and $n^6$ extend to magnets $N^2$, $N^3$, $N^4$, $N^5$, and $N^6$. These magnets form solenoids, the cores N of which are raised when the magnets are energized. The upper ends of these cores normally lie flush with the upper surface of the table, as shown in Fig. 7; but when one of the magnets is energized its core is raised above the surface of the table, as is shown in Fig. 8. The circuit is completed through the wire $n$, magnet M, wire $n'$, contact-points $m$ and $m'$, and wires $m^2$ and $m^3$ to the other side of the battery X.

Mounted upon the armature-lever $p^{10}$ are two spring contact-bars $m^5$ and $m'$, which respectively engage contact-points $m^6$ and $m$. A spring $p^{11}$ serves to withdrawn the armature $p^{10}$ from the magnet. The bell-crank lever $p^2$, which is operated by the magnet M, also carries a contact-point $p^3$, which is adapted to engage a spring contact-bar $p^5$. This latter bar normally tends to engage the contact-pin $p^4$. The principle of operation of this device is best shown in Fig. 9, where the parts are shown diagrammatically. When one of the key-bars is depressed—as, for instance, the bar which contains the letter "C"—the current is closed by contact of the spring $a^3$, carried thereby, with the pin $a^4$ in one of the bars $a^5$. This bar is connected, by means of the wire $n^4$, with the magnet $N^4$. The current passing through this magnet elevates the upper end of its core above the surface of the table. It then passes through the wire $n$ to the magnet M, thus drawing the armature $p$ toward the magnet and causing the contact-pin $p^3$ to be raised from the spring-bar $p^5$ and at the same time causing contact between the spring-bar $p^5$ and the pin $p^4$. The current then passes from the magnet M through the wire $n'$, through the contact-point $m$, spring-bar $m'$, which at this time is held in contact by the action of the armature $p^{10}$, which is normally raised. The current then passes through the spring-bar $m'$, wires $m^2$ and $m^3$, back to the battery X. The action of the magnet M drawing the armature $p$ downward causes the guide-bar $p^7$ to be moved to the left until the adjustable contact-point $p^8$ engages the upper end of the core N. That portion $A^4$ of the frame through which the cores N pass is insulated from the remainder of the frame. It is connected by means of a wire $m^8$ with one side of the magnet M'. The other side of this magnet is connected by means of a wire $m^{13}$ to one end of the spring-bar $p^5$. In the condition of rest of the parts this circuit is broken at this point by the action of the lever $p^2$ upon the spring-bar $p^5$ to disconnect it from the contact-screw $p^4$. When the armature $p$ has been drawn toward its magnet M, the spring-bar $p^5$ has been disengaged from the contact-point $p^3$ and engaged with the contact-point $p^4$, thus closing the circuit between the wires $m^{13}$ and $m^{12}$. The circuit is, however, broken by the non-contact of the contact-point $p^8$ with the solenoid-core $N^4$. The contact-point $p^8$, carried by the slide-bar $p^7$, is connected with a plate $m^9$, which engages a spring $m^{10}$, mounted upon but insulated from the frame. This spring is connected by means of a wire $m^{11}$ with one end of the spring-bar $m'$ and also by means of the wires $m^2$ and $m^3$ with one side of the battery. The wire $m^{12}$ also connects the contact-point $p^4$ with the opposite side of the battery. The action of the current of electricity passing through the magnet M is to draw down its armature, and thus to move the slide-bar $p^7$ toward the left. As soon as the contact-point $p^8$ engages the core N the current is closed through the wire $m^8$, magnet M', wire $m^{13}$, spring-bar $p^5$, wire $m^{12}$ to one side of the battery, and also through the plate $m^9$, spring $m^{10}$, wires $m^{11}$, $m^2$, and $m^3$ to the opposite side of the battery, thus forming a circuit which does not rely upon the key-bars for its continuity. This draws down the armature $p^{10}$, and thus throws the pawl $R^5$ into engagement with the ratchet-wheel R and also breaks the circuit of the magnet M at the contact-point $m$. As a result of this the arm S and the pawl R will be held down and the pawl $S^4$ will be freed from the ratchet-wheel R until the slide-bar $p^7$ has returned to its normal position, which will result in the pin $p^3$ contacting with the spring-bar $p^5$ and breaking the circuit of the magnet M' between said bar and the contact-pin $p^4$. When the armature-lever $p^{10}$ is drawn down to its magnet, the spring $m^5$ will contact with the point $m^6$ and the circuit of the magnet M' be established through the wire $m^7$, contact-point $m^6$, spring $m^5$, wires $m^4$ and $m^3$ to one side of the battery, and through the wire $m^{13}$, spring $p^5$, contact-point $p^4$, and wire $m^{12}$ to the other side of the battery, thus keeping the circuit closed until the slide-bar $p^7$ has fully returned whether the key-lever has been released or not. This circuit is broken by the pin $p^3$ upon the bell-crank lever $p^2$ engaging the spring $p^5$.

By the above-described mechanism the width of each type is accurately registered upon the measuring mechanism, so that the space between the ends of the space-molds and the bar Y is equal to the difference between the space occupied by the type which have been set up and the entire length of the line. This is indicated by means of a register 22, which is mounted on the front of the machine just above the keyboard and which is operated by means of a rod 21, gearing with the bevel-gear 19, secured to the shaft of the wheel R. This indicates the amount of space which is remaining at any time, and when the available space has been mostly used up the line-feed is set in operation, which will also operate the space casting and delivering devices.

The space-bars $M^6$ have attached thereto a rod 26, which extends upwardly and is connected with a crank-arm 25, (see Figs. 2 and 23,) mounted upon one end of a shaft 24, the other end of which carries a crank-arm 23. This crank-arm at its upper end carries a three-pronged lever 28, which is pivoted thereto, and is acted upon by a spring 27. One arm of this lever in its normal position engages a bolt 29, which is adjustable in an arm 30 of the frame, so as to throw the other arm of the lever out of engagement with the teeth formed upon the lower surface of a bar W, which is mounted to slide lengthwise beneath the space-molds. This bar is supported and slides in a block W′, which is mounted to slide vertically in guides $W^3$ on the frame. The bar W is so located as to slide beneath the lower ends of the wedge-blocks *w*. The teeth $W^5$ on the lower side of the bar W are placed corresponding with the spacing of the wedge-blocks *w*. The crank-arm 23 is acted upon at each time the space-bar $M^7$ is depressed—that is, at the end of each word. The bar W is thus given a step-by-step movement beneath the wedge-blocks *w*, passing under another one of the wedge-blocks at each depression of the space-bar $M^7$. This is true, excepting for the first word, as it is desired to have one less space for each line than the number of words included in said line. A bar Z is also mounted to slide in suitable guides on the frame and extends in front of the blocks $v^9$, secured to the outer ends of the pusher-rods $v^7$, by which the spaces are removed from their molds. This bar Z has a bar Z′ secured thereto (see Fig. 24) by means of the threaded bolts $Z^2$, so that the contact-surface of said bar may be adjusted in distance from the bars $v^9$. This bar Z is connected to move with the bar W by means of arms $W^8$ and $W^6$, secured to one end of the bar W. The arm $W^6$ is provided with a vertically-extending slot $W^7$, which engages with a pin $Z^3$ upon one end of the bar Z, so that the bar W may be raised without affecting the bar Z.

The block W′, which forms the guide for the bar W, is connected by a link $W^4$ with a lever 13, suitably pivoted upon the frame and actuated by means of a lever $13^a$, which is journaled upon the same pivot. The lever $13^a$ is provided with an arm $13^c$, engaging the side of the lever 13 and limiting the relative positions of the two levers in one direction. A spring $13^b$, which is secured to one of these levers, bears against the other lever and holds the two together, thus making a yielding lever one end of which may have a definite and regular amount of motion, while the other end may be limited in its motion by the resistance encountered. The variation in the amount of lift in the bar W which would result from the different widths of spaces desired and the consequent difference in elevation of the wedge-blocks is thus allowed for. The lever $13^a$ is engaged by a cam mounted upon the shaft Q′, said shaft being normally quiet, but being given a complete revolution at the time of actuating the line-feed from its connection by chain Q with shaft *g*. The two bars W and Z are drawn backward by means of a cord $W^{10}$, which is secured to the bar W and to one end of a lever $W^{11}$, passing in the meanwhile over a suitable guide-pulley. This lever is a bell-crank lever, one end of which also engages a cam upon the shaft Q′. The reciprocating movement of the space-molds is secured by means of an arm $U^9$, which is pivoted upon the frame and is engaged at one end by a cam upon the shaft Q′ and is connected with the plate U by means of a link $U^7$.

During the process of setting up the line of type the bar W has been intermittently advanced beneath the wedges *w* of the space-molds. When the line-feed is actuated, the bar W is raised in the manner described and the blocks V, forming the molds, separated by the raising of the wedges *w* until the expansion of the blocks V is stopped by engaging the bar Y. The depression of the wedges *w* is insured by a bar 7, which extends above their positions of rest and is carried on rods 8, which slide vertically in guides 9. This is depressed by bell-crank levers 11, which are connected thereto by links 10 and are actuated by cams upon the shaft Q′. The plates U and *u*, carrying these blocks, are then drawn back beneath the reservoir $t^2$, containing molten metal, and the spaces cast. As the molds are moved forward these are separated from the reservoir, and when they get over the guide chutes or tubes *t′* the blocks $v^9$ strike the bar Z′, preventing further movement of the spaces. The plates U and *u* and the blocks V, however, continue for a short distance, whereby the spaces just cast are freed and discharged into the chutes *t′*. To insure the certain discharge of the spaces into the chutes *t′*, a plate 1 is carried above this position upon rods 2, which are mounted to slide vertically in guides 3. (See Figs. 2, 15 to 23.) These are connected by links 5 with bell-crank levers 4, which are operated by cams upon the shaft Q′. By the time the spaces reach the bottom of the chutes the sections of type-carrier which contain the words of the line just set up are beneath the chutes, and the spaces are discharged into them. The lower ends of the chutes are each provided with a slot in one side, which is closed by a spring G′, said spring being normally forced inward by a bell-crank lever $G^4$, thus contracting the chute so that the space cannot escape until the pressure on the spring is released. The bell-crank levers $G^4$ are forced against the springs by engagement of their other ends with cam lugs or projections $G^3$ upon a bar $G^2$, which is mounted to slide upon the frame parallel with the row of chutes $t'$. This bar is reciprocated by means of a lever $G^4$, which is pivoted upon the frame and carries a cam-roller which engages the groove in a cam $g'$ upon the shaft $g$. At the next advance movement of the type-carrier the type are engaged by the fingers $h^4$ upon the plate $h^3$ and removed laterally from the carrier, thus assembling the type of the different words and the spaces in a compact line. The plate $h$, which has acted to support one side of the type, curves laterally and forms one side of a chute through which the type are moved. This end of the plate $h$ has slots therein adapted to receive the fingers by which the type are engaged to move them to the galley.

Two levers H and $H^3$ are pivoted to the frame upon opposite sides of the chute occupied by the type. One end of the lever H when swung directly engages the type through the slot in the side of the plate $h$ to move the type along. The other lever has a spring-held arm $H^7$, one end of which engages a fixed pin or stop $H^9$ to swing it clear of the chute in its position of rest. The arm $H^7$ is bifurcated and straddles the single end of the lever H, engaging the rear end of the line of type to continue their movement about the bend in the chute. A spring $H^8$ connects the arm $H^7$ with the lever $H^3$. The lever $H^3$ is actuated through a link $H^4$ from a lever $H^5$ and cam $g^3$ with a groove in which a cam-roller on the lever $H^5$ engages. The lever H is similarly actuated through a link H' from an arm or lever $H^2$ and cam $g^2$, a cam-roller on the lever entering a groove on the cam. A bar $h^7$ is mounted to slide in a guide $h^6$ alongside the type-chute and carries a spring-held hook or catch $h^8$, which engages the rear end of the type between the bifurcations of the arm $H^7$ to transfer the type opposite the end of the galley. This bar is moved by a lever $h^{10}$, which is connected thereto by a link $h^9$ and is actuated by a cam $g^4$.

When the line of type gets opposite the open end of the galley I, a block $I^4$, which is mounted to slide in guides $I^5$, is advanced, and two thin plates $I^3$, projecting from its face, pass through slots in the plate $h$ and slide the types upon the galley. This block is actuated from the cam $g^5$ by means of the lever $I^7$, cam-roller $I^9$, and link $L^6$. After the block $I^4$ is withdrawn a lead I' is placed behind the type by means of a plate $i$, which slides in guides $i^9$ and up through a slot in the table, actuated by a spring $i^4$ and a lever $i^3$, which carries a roller engaging the periphery of the cam $g^5$ and is connected with the plate by a link $i^2$. One face of the plate $i$ has a recess adapted to just receive one of the leads I', which are contained in a box or reservoir $i^6$ beneath the table and are fed to the plate $i$ by a block $i^7$ and a spring $i^8$.

A reversing-switch 15 is provided for controlling the current to the motor which actuates the threaded rod Y or the line-measuring device. In Fig. 2 this is shown as connected with a battery 18 by wires 17. Three contacts 16 are shown for engagement with the switch-levers 15. By shifting the switch the current to the motor is reversed, and the motor will withdraw the rod Y to its initial position. The switch is shifted by means of a rod 14, which slides in suitable guides and is connected at one end with the switch and at its other end engages the periphery of a cam $14^a$ upon the shaft Q'. The current is conducted from the switch to the motor over wires $17^a$ and $17^b$.

The various steps in the operation of my device are indicated by the diagrams of Figs. 31 to 36, inclusive. The first (shown in Fig. 31) is the assembling of the type for the words of a line each in a separate compartment of the type-carrier. At the same time this is being done the types removed from the reservoirs are replaced by new types which are produced by the type-casting mechanisms. This step also includes the operation of the word-feeding mechanism, the line-measuring mechanism, and the setting of the space-casting mechanism. The next step is the operation of the line-feeding mechanism, which removes the line just set up to beneath the space-inserting mechanism. The line-feed also sets in action the mold adjusting or settling devices and the space casting and delivering-devices. It also sets in action the various mechanisms by which the type are transferred to the galley and the lead inserted, as well as the returning of the line-measuring and space-mold-adjusting mechanisms to their initial positions. The operations of the various parts of the device have been explained in detail at the appropriate places in the description, and a repetition thereof at this point is not deemed necessary.

It would be evident to any mechanic that for the means shown and described herein for accomplishing many of the steps in the process of preparing and assembling the printing-surface other means might be substituted without departing in the least from the spirit of my invention. I do not, therefore, wish to be understood as claiming that the particular means shown and described are the only means which may be used or the only means of which I am aware, as various means for accomplishing the different steps have occurred to me, but only that the means herein shown and described are means which were chosen by me as seeming well adapted for accomplishing the results aimed at.

I claim—

1. The combination with a type-setting mechanism, of a type-casting mechanism containing a series of molds, and a common operating device for both of the mechanisms.

2. The combination of independent type-setting and type-casting mechanisms, a keyboard, and means for operating the type-casting and the type-setting mechanisms from said keyboard.

3. The combination with a type-setting mechanism having type-reservoirs, and means for ejecting type therefrom, of a type-casting mechanism discharging its type into said reservoir, and a common operating means for the type casting and setting mechanisms.

4. The combination with type-setting and type-casting mechanisms having common type-reservoirs, of means for replenishing said reservoirs by the operation of the type-setting mechanism.

5. The combination with type-setting mechanisms and type-casting mechanisms, and type-reservoirs common to both of said mechanisms, of a keyboard, and means for withdrawing type for setting from said reservoirs and means for depositing types as cast in said reservoirs by the operation of the keys of said keyboard.

6. In a type-setting machine in combination, a series of type-molds, a series of type-reservoirs corresponding thereto, individual type-setting mechanisms, and means operated by the type-setting mechanisms for actuating the corresponding type-mold and for depositing the type when cast in its reservoir.

7. The combination with type selecting and delivering mechanisms, of a type receiver or carrier having fixed partitions for the separation of the words, and means for inserting spaces therein after the words forming a line have been set.

8. The combination with type selecting and delivering mechanisms, of a type receiver or carrier having fixed partitions forming word-receiving compartments, and space casting and delivering mechanisms adapted to cast and deliver the spaces within said compartments after the line has been set.

9. The combination with type selecting and delivering mechanisms, of a type receiver or carrier provided with compartments for keeping the words separated, a series of space casting and delivering mechanisms, and means for moving the type receiver or carrier beneath the space-delivering mechanisms to receive the spaces after the line has been set.

10. The combination with type selecting and delivering mechanisms, of a type receiver or carrier provided with means for keeping the words separated, a series of space casting and delivering mechanisms, means for moving the type receiver or carrier beneath the space-delivering mechanisms to receive the spaces after the line has been set, and connections from said feeding mechanism to the space casting and delivering mechanisms to set them in action.

11. In a type-setting machine, the combination with type selecting and delivering mechanisms, of a word-compartment type receiver or carrier, means for giving said carrier a word-length feed between words, and a line-length feed between lines, and space casting and delivering mechanisms adapted to supply the spaces for a line at one operation after its type have been placed in the carrier.

12. In a type-setting machine, the combination with type selecting and delivering mechanisms, of a word-compartment type receiver or carrier, means for giving said carrier a word-length feed between words, and a line-length feed between lines, and means for simultaneously inserting a series of spaces in the word-compartments after they have received their type.

13. In a type-setting machine, the combination with type selecting and delivering mechanisms, of a word-compartment type receiver or carrier, means for giving said carrier a word-length feed between words, and a line-length feed between lines, space-delivering mechanisms adapted to supply the spaces for a line at one operation after its type have been placed in the carrier, and a switch adapted to engage and remove the type from the carrier by its further advance after receiving the spaces.

14. In a type-setting machine, the combination with type selecting and delivering mechanisms, of a word-compartment type receiver or carrier, means for giving said carrier a word-length feed between words, and a line-length feed between lines, space-delivering mechanisms adapted to supply the spaces for a line at one operation after its type have been placed in the carrier, and a guide having a switch at one end adapted to engage and remove the type from the carrier by a further advance after receiving the spaces.

15. In a type-setting machine, the combination with type selecting and delivering mechanisms, of a word-compartment type receiver or carrier, means for giving said carrier a word-length feed between words, and a line-length feed between lines, space-delivering mechanisms adapted to supply the spaces for a line at one operation after its type have been placed in the carrier, a guide having a switch at one end adapted to engage and remove the type from the carrier by a further advance after receiving the spaces, and means for automatically transferring the lines of type from said guide to a galley.

16. In a type-setting machine, the combination, with type selecting and delivering mechanisms, of a type receiver or carrier provided with means for keeping the words separated, means for giving said carrier a word-length feed between words, and a line-length feed between lines, and a series of space casting and delivering mechanisms brought into registry with the word-spaces of the carrier by said line-feed.

17. In a type-setting machine, the combination, with type selecting and delivering mechanisms, of a type receiver or carrier provided with means for keeping the words separated, means for giving said carrier a word-length feed between words, and a line-length feed between lines, a series of space casting and delivering mechanisms brought into registry with the word-spaces of the carrier by said line-feed, and actuating connections from the line-feeding mechanism to the space-delivering mechanisms.

18. In a type-setting machine, the combination with type selecting and delivering mechanisms, of a type receiver or carrier, provided with compartments for keeping the words separated, means for giving said carrier a word-length feed between words and a line-length feed between lines, a series of space casting and delivering mechanisms brought into registry with the word-spaces of the carrier by said line-feed, and actuating connections from the line-feeding mechanism to the space-delivering mechanisms.

19. In a type-setting machine, the combination with type selecting and delivering mechanisms, of a holder having separate word-compartments, and means for giving said holders a word-length feed between words and a line-length feed between lines.

20. In a type-setting machine, the combination of a holder having separate word-compartments, with means for delivering the type of each word to a separate compartment, as set, and means for giving said holder a word-length feed between words and a line-length feed between lines.

21. In a type-setting machine, the combination with type selecting and delivering mechanisms, of a holder having separate word-compartments, and means for intermittently moving said holder relative to the delivering mechanism whereby the type for each word may be inserted in a separate compartment of the holder, with a space-casting mechanism and means for delivering the spaces to the said compartments.

22. In a type-setting machine, the combination of a type receiver or holder, having a separate compartment for each word of the line, and means for delivering the type to said compartments, with a space-casting mechanism, and means for delivering the spaces to said compartments after the type for a line are in place.

23. In a type-setting machine, the combination of a type receiver or holder, having a separate compartment for each word of the line, and means for delivering the type to said compartments, with means for delivering the spaces to said compartments after the type are in place.

24. In a type-setting machine, the combination of a type receiver or holder, having a separate compartment for each word of the line, and means for delivering the type to said compartments, with means for delivering the spaces for a line to the compartments after the types have been placed.

25. In a type-setting machine, the combination of a type receiver or holder, having single-word compartments, and means for delivering type to said compartments, with means for delivering the spaces to said compartments at the corresponding side of the types in the different compartments.

26. In a type-setting machine, the combination of a type receiver or holder, having single-word compartments, and means for delivering type to said compartments, with means for delivering the spaces to said compartments after the line has been set up, and at the same side of the types in the different compartments.

27. In a type-setting machine, the combination of a type receiver or holder having single-word compartments, and means for delivering type to said compartments, with means for simultaneously delivering all the spaces for a line to said compartments after the line has been set up, and at the same side of the types in the different compartments.

28. A type receiver or holder for type-setting machines, consisting of a series of sections connected to form an endless belt or chain, each section having a type-receiving recess adapted to receive the type for one word.

29. A type receiver or holder for type-setting machines, consisting of a series of sections connected to form an endless belt or chain, each section having a type-receiving recess opening to one side face and adapted to receive the type for one word.

30. A type receiver or holder for type-setting machines, consisting of a series of sections connected to form an endless belt or chain, each section having a type-receiving recess adapted to receive the type for one word, in combination with means for giving the chain an intermittent feeding movement beneath the type-delivering mechanism.

31. A type receiver or holder for type-setting machines, consisting of a series of sections connected to form an endless belt or chain, each section having a type-receiving recess adapted to receive the type for one word, and a spring-held type-holding finger for each section.

32. A type receiver or holder for type-setting machines, consisting of a series of sections connected to form an endless belt or chain, each section having a type-receiving recess opening to one side face and adapted to receive the type for one word, and spring-fingers bearing upon one end of the row of type in each recess.

33. A type receiver or holder, comprising a series of blocks having pivot-eyes thereon and adapted to be joined thereby into a chain or belt, said blocks having each a type-holding recess adapted to accommodate the type for a word.

34. A type receiver or holder, comprising a chain, the links of which have each a type-receiving recess in one side face, and longitudinal grooves extending beneath the type-receiving recess, and adapted to receive type-removing fingers.

35. A type receiver or holder, comprising a chain, the links of which have each a type-receiving recess in one side face, and longitudinal grooves extending beneath the type-receiving recess and adapted to receive type-removing fingers, and means for holding the type in place in said recesses.

36. A type receiver or holder, comprising a chain, the links of which have each a type-receiving recess in one side face, and longitudinal grooves extending beneath the type-receiving recess, and adapted to receive type-removing fingers, and a spring type-retaining finger holding the type in place in said recesses.

37. A type receiver or holder, comprising a chain, the links of which have each a type-receiving recess open at three sides, longitudinal grooves extending beneath said recess and adapted to receive type-removing fingers, and a slot extending through the side wall of the recess, and a spring-held type-retaining finger extending through said slot and adapted to engage the type to hold them in place.

38. In a type-setting machine having an operating-keyboard, the combination of a plurality of adjustable space-molds, with a line-measuring device controlling the adjustment of said mold, and actuated through the type-setting keys.

39. In a type-setting machine having an operating-keyboard, the combination of an adjustable space-mold, with means for automatically proportioning said molds to the unfilled space in the line, connected with and controlled by the type-setting keys.

40. In a type-setting machine having an operating-keyboard, the combination of adjustable space-molds, and means for separating them, with an adjustable limit-stop actuated from the keyboard.

41. In a type-setting machine, the combination of adjustable space-molds, and means for separating them, with an automatic line-measuring device controlling the adjustment of said molds and actuated by the type-setting mechanism to simultaneously insert all the spaces in a line after the line has been set.

42. In a type-setting machine, the combination with an operating-keyboard, adjustable space-molds, and means for separating them, of a limit-stop for said separating means, and an adjusting mechanism for said stop electrically connected with the keyboard.

43. In a type-setting machine, the combination of an adjustable space-mold, and means for separating its parts, with an adjustable limit-stop, a type-measuring device, a keyboard and means for controlling the action of the type-measuring device from the keyboard.

44. In a space-mold for type-setting machines, the combination of a series of separable blocks adapted when separated to provide space-casting recesses or holes, with means for equally separating the different blocks, and an adjustable limit-stop therefor, and operating connections for said stop from the type-setting mechanism.

45. In a space-mold for type-setting machines, the combination of a series of separable blocks adapted when separated to provide space-casting recesses or holes, with means for equally separating the different blocks, and an adjustable limit-stop therefor having an operating connection with the type-setting mechanism during the operation of assembling the type.

46. In a space-mold for type-setting machines, the combination of a series of separable blocks adapted when separated to provide space-casting recesses or holes with means for equally separating the different blocks, an adjustable limit-stop therefor, and a line-measuring device controlling said limit-stop and having an operative connection with the type-setting mechanism during the operation of assembling the type.

47. In a space-mold for type-setting machines, the combination of a series of separable blocks adapted when separated to provide space-casting recesses or holes, with means for equally separating the different blocks, an adjustable limit-stop therefor, an operative connection between said stop and the type-setting mechanism for automatically advancing said stop an amount corresponding with the thickness of the type as the type are assembled.

48. A space-mold for type-setting machines, comprising a series of separable members adapted when separated to form recesses adapted to serve as space-molds, means for automatically separating said members an amount which in the total equals the difference between the line length and the space occupied by the type, and means connected with the type-setting mechanism for controlling the amount of said separation.

49. A space-mold for type-setting machines, comprising a series of separable members adapted when separated to form recesses adapted to serve as space-molds, and means connected with and adjusted by the type-setting mechanisms for automatically separating said members an amount which in the total equals the difference between the line length and the length occupied by the type, a fluid-metal receptacle, and means for connecting said recesses with said fluid-metal receptacle.

50. In an apparatus for forming a printing-surface, the combination with a keyboard and a device operated by the action of the keys in assembling the type for measuring the unfilled space in each line, of a space-key, and devices operated by the space-key and controlled by said measuring device for automatically dividing the unfilled space in the line to determine the size of the spaces required to justify the line.

51. In an apparatus for forming printing-surfaces the combination with an adjustable space-mold, of automatic means connected with and operated by the type-assembling mechanism for adjusting said mold to properly justify the line.

52. In an apparatus for forming printing-surfaces the combination of an adjustable mold, with automatic means for determining the width of said mold connected with and operated by the keys during the process of assembling the type.

53. In a type-setting machine the combination of a series of space-molds with means connected with and actuated by the operation of the type-assembling mechanisms for automatically selecting the number of molds required in each line.

54. In a type-setting machine the combination of a series of adjustable space-molds with means for automatically selecting the number of molds required actuated by the type-assembling mechanism during the setting of the types.

55. In a type-setting machine the combination of a series of space-molds with means for automatically selecting the number of molds used and means actuated by the keys during the assembling of the type for automatically controlling their dimension so as to justify the line.

56. In a type-setting machine the combination of a type receiver or carrier composed of a chain, the links of which have each a recess adapted to hold the type of one word, with type selecting and delivering mechanisms, and means for giving the chain an intermittent forward motion to present a new link to the type-delivering mechanism.

57. In a type-setting machine the combination of a type receiver or carrier composed of a chain, the links of which have each a recess adapted to hold the type of one word, with type selecting and delivering mechanisms, means for giving the chain an intermittent forward motion to present a new link to the type-delivering mechanism, and a type-packing mechanism actuated by the type-setting mechanism and acting upon the type as delivered to the carrier to pack them at one end of the recess.

58. In a type-setting machine the combination of a type receiver or carrier composed of a chain, the links of which have each a recess adapted to hold the type of one word, with type selecting and delivering mechanisms, means for giving the chain an intermittent forward motion to present a new link to the type-delivering mechanism, a type-packing mechanism actuated by the type-setting mechanism and acting upon the type as delivered to the carrier to pack them at one end of the recess, and a spring retaining-finger for holding the type in place.

59. In a type-setting machine the combination of type selecting and delivering mechanisms and an independent space-delivering mechanism, with a word-compartment type carrier or holder and means for presenting the compartments to the type-delivering mechanism and then to the space-delivering mechanism.

60. In a type-setting machine the combination of type selecting and delivering mechanisms, an endless type receiver or carrier having type-receiving recesses, and means for advancing said carrier for each word set, with a type-packing finger entering said recesses, and means for reciprocating said finger to pack the type at one end of the recess.

61. In a type-setting machine the combination of type selecting and delivering mechanisms, an endless type receiver or carrier having type-receiving recesses, and means for advancing said carrier for each word set, with a type-packing finger entering said recesses, and means for reciprocating said finger after the delivering of each type to the carrier to pack the type at one end of the recess.

62. In a type-setting machine the combination of type selecting and delivering mechanisms, an endless type receiver or carrier having type-receiving recesses, and means for advancing said carrier for each word set, with a type-packing finger entering said recesses, and means for reciprocating said finger to pack the type at one end of the recess, a spring type-retaining finger, and means for holding it out of action while the type are being placed in the carrier.

63. In a type-setting machine the combination of type selecting and delivering mechanisms, an endless type receiver or carrier having type-receiving recesses, and means for advancing said carrier for each word set, with a type-packing finger entering said recesses, and means for reciprocating said finger to pack the type at one end of the recess, a spring type-retaining finger and a detent engaging and holding back said finger while the type are being introduced to the carrier, and releasing means for said detent actuated by the chain.

64. In a type-setting machine the combination of type selecting and delivering mechanisms, with an endless type receiver or carrier having blocks therein each provided with a type-receiving recess open at one side face, means for advancing said carrier, a plate in front of said open side faces of the blocks, and a switch or removing finger adapted to engage the type to remove them from the carrier.

65. In a type-setting machine the combination of type selecting and delivering mechanisms, with an endless type receiver or carrier having blocks thereon each provided with a type-receiving recess open at one side face, and longitudinal grooves extending beneath said recess, means for advancing said carrier, a plate in front of said open side faces of the blocks, and a switch having fingers entering grooves to remove the types from the recesses in the blocks.

66. In a type-setting machine the combination of type selecting and delivering mechanisms, with an endless type receiver or carrier having blocks thereon, each provided with a type-receiving recess open at one side face, and grooves extending through the end walls of said recess, means for advancing said carrier, a plate in front of said open side faces of the blocks, and a switch having fingers entering the grooves to remove the types from the recesses in the blocks.

67. In a type-setting machine the combination of a type receiver or carrier having separate compartments for each word, said compartments opening at one side face of the carrier and having longitudinal grooves extending to the bottom of the type-receiving compartments, and means for advancing the carrier as the type is set, with a switch having fingers entering said grooves to remove the types from the compartments.

68. In a type-setting machine the combination of a type receiver or carrier having separate compartments for each word opening at one side face of the carrier, and longitudinal grooves extending to the bottom of the type-receiving compartments, a separate plate closing the side openings of said compartments, and means for advancing the carrier as the type is set, with a switch having fingers entering said grooves to remove the types from the compartments.

69. In a space-casting device for type-setting machines and the like, the combination of a frame in two parts movable relative to each other, mold-forming blocks slidably carried by one part of the frame and separable from each other, said blocks being provided at one end with registering notches and projections adapted in connection with the other frame member to form space-casting molds, and means for inserting said spaces between the words as cast to justify the line.

70. In a space-casting device for type-setting machines and the like, the combination of a frame in two parts movable relative to each other, mold-forming blocks slidably carried by one part of the frame and separable from each other, said blocks being provided at one end with registering notches and projections adapted in connection with the other frame member to form space-casting molds, a reservoir for melted type-metal, and means for connecting said reservoir with said casting-molds, and means for inserting said spaces as cast between the words to justify the line.

71. In a space-casting device for type-setting machines and the like, the combination of a frame in two parts movable relative to each other, mold-forming blocks slidably carried by one part of the frame and separable from each other, said blocks being provided at one end with registering notches and projections adapted in connection with the other frame member to form space-casting molds, and means for controlling the extent of separation of the mold-forming blocks by the operation of the keys in assembling the type.

72. In a space-casting device for type-setting machines and the like, the combination of a frame in two parts movable relative to each other, mold-forming blocks slidably carried by one part of the frame and separable from each other, said blocks being provided at one end with registering notches and projections adapted in connection with the other frame member to form space-casting molds, means for controlling the number of said blocks which are to be separated by the operation of the keys in assembling the type.

73. In a space-casting device for type-setting machines and the like, the combination of a frame in two parts movable relative to each other, mold-forming blocks slidably carried by one part of the frame and separable from each other, said blocks being provided at one end with registering notches and projections adapted in connection with the other frame member to form space-casting molds, independent separating means between each pair of blocks, and means for controlling the number thereof which are to be used by the operation of the keys in assembling the types.

74. In a space-casting device for type-setting machines and the like, the combination of a frame in two parts movable relative to each other, mold-forming blocks slidably carried by one part of the frame and separable from each other, said blocks being provided at one end with registering notches and projections adapted in connection with the other frame member to form space-casting molds, independent separating means between each pair of blocks, actuating means therefor having an adjustable bar adapted to engage the mold-separating devices, and adjusting means for said bar controlled by the operation of the keys in assembling the types.

75. In a space-casting device for type-setting machines and the like, the combination of separable mold-forming blocks recessed to form space-molds between them, independent separating means for each pair of blocks, and selecting means controlled by the type-assembling mechanism to determine the number of molds used.

76. In a space-casting device for type-setting machines and the like, the combination of separable mold-forming blocks recessed to form space-molds between them, independent separating means for each pair of blocks, and means limiting the separation of the blocks controlled by mechanism set in action by the keys in assembling the types.

77. In a space-casting device for type-setting machines and the like, the combination of separable mold-forming blocks recessed to form space-molds between them, independent separating means for each pair of blocks, and selecting means controlled by the number of words in the line to determine the number of molds used, and means limiting the separation of the blocks controlled by the operation of the keys in assembling the types.

78. In a space-casting device for type-setting machines and the like, the combination of separable mold-forming blocks having registering recesses and projections in one end adapted to form casting-recesses when separated and a common abutting member movable relatively thereto, with plungers forming one side of the mold and movable to force out the spaces after casting and insert them between the words.

79. In a space-casting device for type-setting machines and the like, the combination of separable mold-blocks having registering notches and projections adapted to form the mold, wedges between said blocks adapted to separate them, an actuating mechanism for said wedges, and means controlled by the space occupied by the type of a line limiting the amount of insertion of said wedges.

80. In a space-casting device for type-setting machines and the like, the combination of separable mold-blocks having registering notches and projections adapted to form the mold, wedges between said blocks adapted to separate them, an actuating mechanism for said wedges, and means controlled by the number of words in a line for determining the number of wedges engaged thereby.

81. In a space-casting device for type-setting machines and the like, the combination of separable mold-blocks having registering notches and projections adapted to form the mold, wedges between said blocks adapted to separate them, an actuating mechanism for said wedges, means controlled by the number of words in a line for determining the number of wedges engaged thereby, and means controlled by the space occupied by the type of a line limiting the amount of insertion of said wedges.

82. A line-measuring mechanism for type-setting machines, comprising a space-mold, means for adjusting the same, a movable stop for said mold, an adjusting device therefor and means for actuating said adjusting device through the keys used in assembling the types.

83. A line-measuring mechanism for type-setting machines and the like, comprising a mold-controlling member, and means for moving the same an amount corresponding to the thickness of the type by the act of setting the type.

84. A line-measuring mechanism for type-setting machines and the like, comprising a movable member, operating means therefor, limiting-stops therefor proportioned to the widths of the types, and stop-selecting means directly controlled by the keys in assembling the types.

85. A line-measuring mechanism for type-setting machines and the like comprising a movable member, operating means therefor, limiting-stops therefor proportioned to the widths of the types, and electrically-operated means for said stops having normally open circuits, and means for closing the circuits by the operation of the type-setting keys in assembling the types.

86. A line-measuring device for type-setting machines comprising a threaded bolt and nut having relative rotation, means for turning the rotatable member actuated by the type-setting, variable limiting-stops therefor and selecting means for said limiting-stops actuated by said keys.

87. A line-measuring device for type-setting machines, comprising a threaded bolt and nut having relative rotation, means for turning the rotatable member actuated by the type-setting keys, limiting-stops therefor set to permit variable movement thereof, and magnets for moving said stops into operative positions, the circuit of each magnet having a group of type-setting keys connected therein to act as closing-switches.

88. In a type-setting machine the combination of a movable type-receiver having one side open and a longitudinal groove extending from said open side to the bottom of the space occupied by the type with a plate adjacent the open side of the receiver serving to hold the type therein, said plate curving outward at one point, a coöperating plate adapted to form therewith a channel for the type and having a finger entering said groove in the type-receiver, to remove the type therefrom.

89. In a type-setting machine the combination of a movable type-receiver having one side open and a longitudinal groove extending from said open side to the bottom of the space occupied by the type with a plate adjacent the open side of the receiver serving to hold the type therein, said plate curving outward at one point, a coöperating plate adapted to form therewith a channel for the type and having a finger entering said groove in the type-receiver, to remove the type therefrom, one of said plates having a longitudinal slot, transferring-fingers adapted to enter said slot to engage the type, and means for operating said fingers.

90. In a type-setting machine the combination of a series of individual type casting and setting mechanisms, means for operating the type-setting mechanisms, and connections between each individual type-casting mechanism and its corresponding type-setting mechanism for actuating the type-casting mechanisms.

91. In an apparatus for forming printing-surfaces the combination with a keyboard, means connected with and operated by the keyboard for measuring the unset space in the line as the line is set, and means operated by the keyboard for determining the number of spaces required, of adjustable space-molds, a space-key, and means operated by said space-key for dividing said measured space between the determined number of space-molds.

92. In an apparatus for forming printing-surfaces the combination of an adjustable space-mold, with means controlled by the operation of the type-setting mechanism as the types are set for determining the size of said mold independently of the types.

93. The combination of independent series of type-casting and type-setting mechanisms, and means connecting corresponding elements of the type-casting and type-setting mechanisms whereby the action of the type-setting mechanism in removing a type actuates the corresponding type-casting mechanism to produce a similar type.

94. In a type-setting machine the combination with a space-mold, and means for adjusting said mold to cast spaces to justify the line, of a keyboard divided into groups, each group having independent connections with said adjusting mechanism whereby at the depression of any key in a group the mold is adjusted a distance corresponding with the width of the type assembled by the keys of said group.

95. The combination with a keyboard divided into groups, means for assembling type of the same width actuated by the keys in any group and of different widths by the keys of different groups, of a space-casting mechanism and means controlled by the keys whereby the space-casting mechanism is adjusted to cast spaces of proper width to justify the line.

96. In a type-setting mechanism, the combination with a keyboard, and means for assembling type by operating said keyboard, of an adjustable space-mold, and means controlled by the keys used in the assembling of the type whereby said space-mold is adjusted the distance required to justify the line.

97. In a type-setting machine, the combination with an adjustable space-mold, and means for separating its parts of a type-measuring device controlling the adjustment of said parts, a keyboard and means for controlling the action of the type-measuring device from the keyboard.

98. In a type-setting machine the combination with an adjustable space-mold, and a keyboard divided into groups of keys, the keys of any group representing letters of uniform width and the keys of different groups representing letters of different widths, of means set in action by the use of any key for adjusting the space-mold, and adjustment-controlling devices each controlled by the keys of its particular group to determine the amount of said adjustment.

99. A type-setting machine having a keyboard divided into groups, the keys of any group representing letters of the same width and the keys of different groups representing letters of different widths and means connected with each group for adjusting the space between words to justify the line.

100. In a type setting and casting machine, a keyboard, keys arranged in groups corresponding to the width of the characters represented by said keys and means connected with each group of keys whereby the space occupied by the types is measured and mechanism substantially as described whereby the line is justified.

101. A line-measuring mechanism for type-setting machines and the like, comprising a movable member, operating means therefor, limiting-stops therefor proportioned to the width of the types, and stop-selecting means directly controlled by the keys on the keyboard.

102. In an apparatus for forming printing-surfaces, a keyboard having sets of keys, the keys of any set representing letters of the same width and the keys of different sets representing letters of different widths, and means connected with said sets for automatically determining the space required to justify the line.

103. In an apparatus for forming printing-surfaces, a keyboard, keys arranged in sets corresponding to the width of the characters represented by said keys, and means connected with said sets of keys, whereby the space required to justify the line is determined and means whereby said space is automatically distributed between words to justify the line.

In testimony whereof I have signed my name to this specification in the presence of two subscribing witnesses.

BYRON A. BROOKS.

Witnesses:
W. A. PAULING,
G. A. ROEDER.